(12) United States Patent
Gu

(10) Patent No.: US 6,798,551 B2
(45) Date of Patent: Sep. 28, 2004

(54) GIRES-TOURNOIS INTERFEROMETER WITH FARADAY ROTATORS FOR OPTICAL SIGNAL INTERLEAVER

(75) Inventor: Shijie Gu, Sunnyvale, CA (US)

(73) Assignee: Oplink Communications, Inc, San Jose, CA (US)

( * ) Notice: Subject to any disclaimer, the term of this patent is extended or adjusted under 35 U.S.C. 154(b) by 0 days.

(21) Appl. No.: 10/377,856

(22) Filed: Feb. 28, 2003

(65) Prior Publication Data

US 2003/0160963 A1 Aug. 28, 2003

Related U.S. Application Data

(62) Division of application No. 09/929,875, filed on Aug. 13, 2001, now Pat. No. 6,611,340.

(51) Int. Cl.[7] .............................. G02F 1/03; G01B 9/02
(52) U.S. Cl. ........................ 359/246; 356/491; 356/519
(58) Field of Search ................................. 359/246, 279, 359/494, 495, 496, 497, 498, 499, 484, 237; 385/3, 39; 356/491, 519; 398/65, 81, 82

(56) References Cited

U.S. PATENT DOCUMENTS 6,169,604 B1   1/2001   Cao ........................... 356/519

Primary Examiner—Hung Xuan Dang
Assistant Examiner—Tuyen Tra
(74) Attorney, Agent, or Firm—Lumen Intellectual Property Services, Inc.

(57) ABSTRACT

A GTIFR interferometer, for use in an interleaver or in a deinterleaver, wherein the GTIFR interferometer includes a Gires-Toutnois interferometer with a 45 degree Faraday rotator between the mirrors of the Gires-Tournois interferometer and further includes a 22.5 degree Faraday rotator in the light path to the Gires-Tournois interferometer and an interleaver or deinterleaver that contains one GTIFR. A dispersion compensated GTIFR interleaver includes a second Gires-Tournois interferometer for providing chromatic dispersion compensation.

18 Claims, 20 Drawing Sheets

θ degree Faraday Rotator

GIRES-TOURNOIS INTERFEROMETER WITH FARADAY ROTATORS FOR OPTICAL SIGNAL INTERLEAVER

CROSS-REFERENCE TO RELATED APPLICATIONS

This is a divisional patent application of a U.S. patent application Ser. No. 09/929,875, filed Aug. 13, 2001, now allowed, now U.S. Pat. No. 6,611,340 B2 the content of which is hereby incorporated herein by reference. This application further relates to a co-pending U.S. patent application Ser. No. 09/874,925, filed Jun. 04, 2001, the content of which is also hereby incorporated herein by reference.

FIELD OF THE INVENTION

This invention relates generally to the field of optical communications systems. More particularly, the invention relates to interface devices such as interleavers and deinterleavers that are used for interfacing between portions of Dense Wave Division Multiplexed (DWDM) systems that operate at channel spacings differing by a factor of two, between, for example, portions operating at 50 GHz per channel and portions operating at 100 GHz per channel.

BACKGROUND OF THE INVENTION

As DWDM optical communications technology has progressed, the channel spacing has changed over a number of years from 200 GHz to 100 GHz to 50 GHz per channel. When a communications system is in the process of being upgraded from say 100 GHz per channel to 50 GHz per channel, it may be expedient to retain some older equipment in the system, for example, older equipment that was designed for use at 100 GHz per channel. The older equipment can be retained in the upgraded system by using interleavers and deinterleavers to interface between the older equipment and the newer equipment.

An interleaver combines an optical signal containing even channels with an optical signal containing odd channels. A 50 GHz interleaver, for example, combines an optical signal containing a set of even channels having 100 GHz spacing with an optical signal containing a set of odd channels having 100 GHz spacing and produces an output optical signal containing the set of even channels and the set of odd channels with 50 GHz spacing per channel.

A deinterleaver reverses the process of the interleaver. A 50 GHz deinterleaver, for example, separates even channels from odd channels to produce two output signals, an output signal containing the set of even channels having 100 GHz channel spacing and an output signal containing odd channels and having 100 GHz channel spacing.

The general principle of the interleaver is based on the interference of two light beams. The interference creates a periodic repeating output as different integral multiples of wavelengths pass through the device and the desired channel spacing of the interleaver is set by controlling the fringe pattern. Manufacturers today use fused-fiber Mach-Zehnder interferometers, liquid crystals, birefringent crystals, Gires-Tournois interferometers (GTI) and other devices to build interleavers and deinterleavers.

Of these, the GTI based interleaver and deinterleaver have many advantages over the rest. For example, a GTI based interleaver has very low insertion loss, has uniform response over a wide range of wavelengths (flat-top spectrum), and has minimal polarization dependence effect.

Chromatic dispersion must be considered for 10 Gbit/s and next generation 40 Gbit/s systems. Chromatic dispersion requirements for the higher bit rate systems are extremely tight. While there are currently many technologies being pursued for use in interleaver products, the dispersion performance will probably be a critical factor in determining which technology will be successful. To be successful, the interleaver must not only have a low dispersion value at the center ITU wavelength, but over the full useful passband of the device (i.e. the dispersion should not reduce the usable passband). Unfortunately, the GTI based interleaver has a very large dispersion of up to 70–200 ps/nm for a 50 GHz interleaver and up to 250–800 ps/nm for a 25 GHz interleaver.

U.S. Pat. No. 6,169,604, entitled "NONLINEAR INTERFEROMETER FOR FIBER OPTIC DENSE WAVELENGTH DIVISION MULTIPLEXER UTILIZING A PHASE BIAS ELEMENT TO SEPARATE WAVELENGTHS IN AN OPTICAL SIGNAL", issued to Cao, discloses a multiplexer that includes two non-linear interferometers, wherein each nonlinear interferometer (NLI) is a GTI with an internal $\lambda/4$ wave-plate and an external $\lambda/8$ wave-plate (FIGS. 8 and 9 in U.S. Pat. No. 6,169,604).

In co-pending patent application Ser. No. 09/874,925, entitled "OPTICAL SIGNAL INTERLEAVER AND DEINTERLEAVER DEVICES WITH CHROMATIC DISPERSION COMPENSATION", incorporated herein by reference, the present inventor discloses a dispersion compensated interleaver and a dispersion compensated deinterleaver, each of which includes an NLI and a GTI dispersion compensator.

In an NLI, the angular alignment of the c-axis of the wave-plates relative to the direction of polarization is both critical and difficult. The correct angular alignment of the direction of the c-axis relative to the direction of polarization of the light beam entering the wave-plate is 45° for both the $\lambda/4$ wave-plate and the $\lambda/8$ wave-plate. Misalignment of as little as 1°, that is to say rotation of a wave-plate by as little as 1° around the direction of the beam from 45° to 46° or to 44°, causes serious distortion of the spectrum shape and group delay of the interleaver (or deinterleaver). Some examples of the distortions arising from misalignment of the $\lambda/8$ plate will now be presented.

Misalignment degrades the isolation between channels. For example, a misalignment of the $\lambda/8$ wave-plate by 1° reduces the isolation between even channels and adjacent odd channels by 10%.

Misalignment distorts the group delay. FIG. 1 shows the group delay of a perfectly aligned 50/100 GHz NLI based interleaver (or deinterleaver). FIG. 1 applies to both odd and even channels. FIGS. 2 and 3 show group delay for odd and even channels, respectively, for the same NLI based device as in FIG. 1, but with misalignment of the c-axis of the $\lambda/8$ wave-plate of 1°, from 45° to 46°. The distortion of the group delay in FIGS. 2 and 3 as compared to FIG. 1 is apparent. Note that the distortion of the group delay is different for odd channels than for even channels. Such serious asymmetric distortions of the group delay make it very difficult to compensate for chromatic dispersion.

OBJECTS AND ADVANTAGES

It is an object of the present invention to provide an interferometer which separates or combines signals for odd and even channels (for use in an interleaver or deinterleaver) and which has a group delay characteristic that is free of distortion arising from misalignment of phase shifting components relative to the direction of polarization of light entering the interferometer.

It is an object of the present invention to provide an optical interleaver and deinterleaver in which the group delay is not subject to distortion arising from angular misalignment of optical phase shifter components around an axis defined by the direction of the optical beam.

It is a further object of the present invention to provide an interleaver and deinterleaver in which the isolation between channels is not subject to degradation arising from angular misalignment of optical phase shifter components around an axis defined by the direction of the optical beam.

It is a further object of the present invention to provide an interleaver and deinterleaver in which a GTI is used as a dispersion compensator, and in which the absence of angular misalignment allows more effective chromatic dispersion compensation.

SUMMARY

The objects and advantages of the present invention are provided by an interferometer that is a combination of a Gires-Tournois interferometer with Faraday rotators (hereafter GTIFR). The GTIFR is intended for use in a deinterleaver or interleaver.

The GTIFR in accordance with the present invention is a Gires-Tournois interferometer with a 45-degree Faraday rotator between the mirrors of the Gires-Tournois interferometer and a 22.5-degree Faraday rotator in the light path of light entering and leaving the Gires-Tournois interferometer. The Faraday rotators are preferably garnets, though any other type of Faraday rotator may be used.

The structure of the GTIFR includes a Gires-Tournois interferometer that has a partially reflective mirror optically coupled to a highly reflective mirror. The mirrors are parallel and separated by a fixed distance d. In the cavity between the mirrors there is a 45-degree Faraday rotator in the light path. The partially reflective mirror provides a port for light to enter and leave the Gires-Tournois interferometer. Outside the Gires-Tournois interferometer, in the path of light entering and leaving the Gires-Tournois interferometer, there is a 22.5-degree Faraday rotator.

In the operation of the GTIFR, as used in the single GTIFR interleaver or deinterleaver of the present invention, plane polarized light containing signals for odd and even channels passes through the 22.5 degree Faraday rotator and becomes circularly polarized with 22.5 degree phase difference. The light is then reflected from the Gires-Tournois interferometer with a phase change that is a function of the GTI and of the 45 degree Faraday rotator. The light then passes through the 22.5 degree Faraday rotator for a second time, where the phase characteristic is again changed.

An interleaver in accordance with the present invention requires only one GTIFR. Likewise a deinterleaver in accordance with the present invention requires only one GTIFR.

A GTIFR in accordance with the present invention, when used in a deinterleaver in accordance with the present invention, receives optical signals that are plane polarized in one direction and that contain signals for a set of even channels and for a set of odd channel. The signals are reflected by the GTIFR and then enter a polarization beam splitter. A signal containing one set of channels is reflected from the polarization beam splitter and a signal containing the other set of channels is transmitted by the polarization beam splitter.

A GTIFR in accordance with the present invention, when used in an interleaver in accordance with the present invention, receives plane polarized optical signals for a set of even channels and for a set of odd channels, the direction of polarization for the even channels being perpendicular to the direction of polarization of the odd channels. The signals are reflected from the GTIFR and enter a polarization beam splitter where both sets of channels are transmitted by the beam splitter.

As disclosed in co-pending application Ser. No. 09/874,925, a Gires-Tournois interferometer can be used to compensate for chromatic dispersion in a deinterleaver or interleaver.

In a dispersion compensated deinterleaver in accordance with the present invention, the even channel and odd channel signals pass through a Gires-Tournois interferometer dispersion compensator before being reflected by the GTIFR.

In a dispersion compensated interleaver in accordance with the present invention, the even channel and odd channel signals pass through a Gires-Tournois interferometer dispersion compensator after being reflected by the GTIFR.

DETAILED DESCRIPTION

Figure 1:
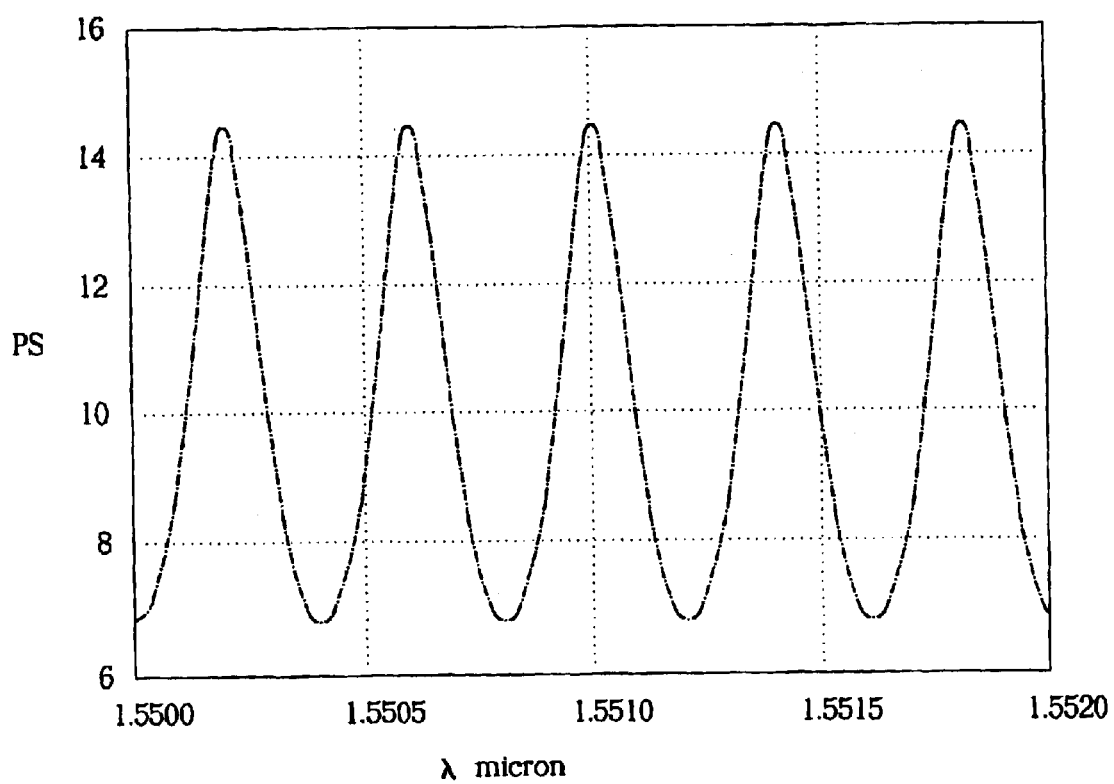
FIG. 1 is a graph of the group delay for a NLI in which the $\lambda/4$ wave-plate and the $\lambda/8$ wave-plate are perfectly aligned.
Figure 2:
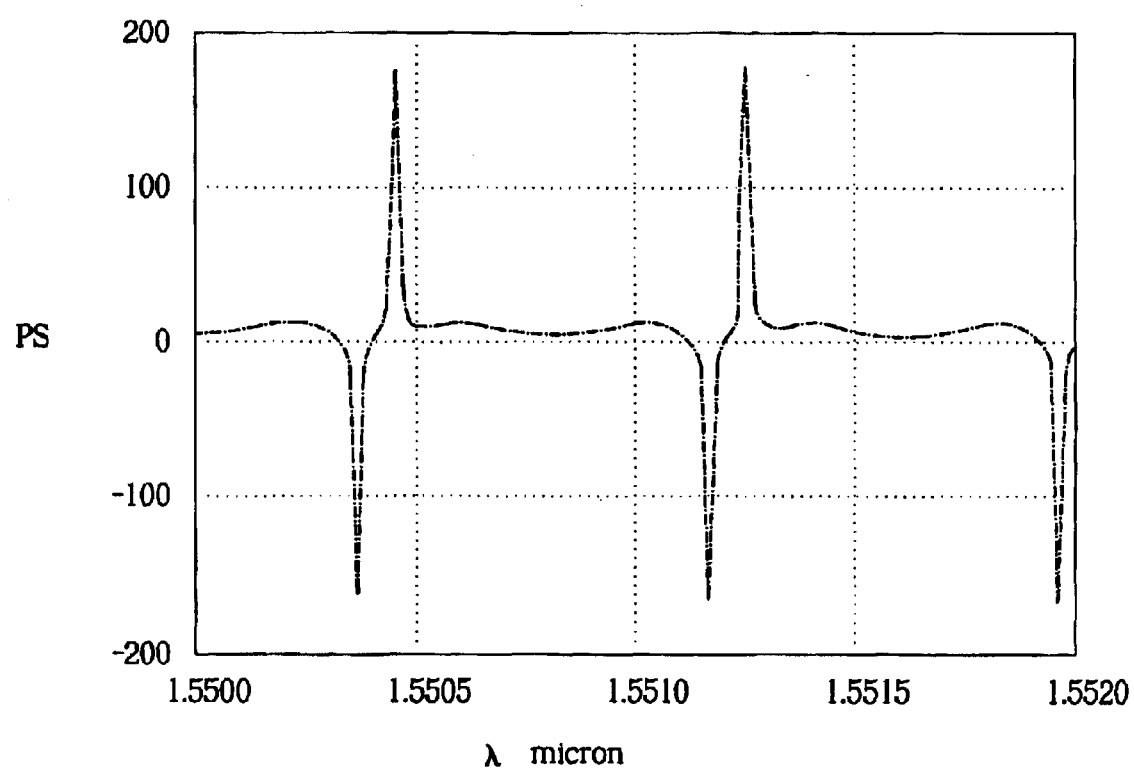
FIG. 2 is a graph showing the group delay for odd channels for a NLI in which the $\lambda/8$ wave-plate is misaligned by 1°.
Figure 3:
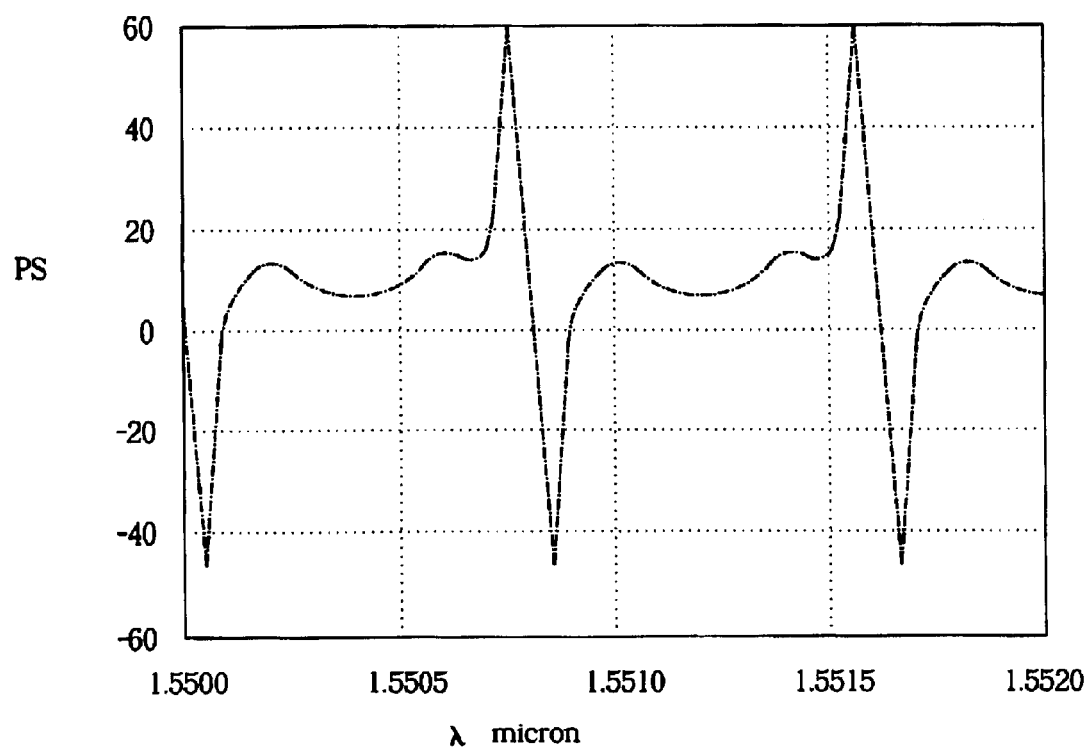
FIG. 3 is a graph showing the group delay for even channels for a NLI in which the $\lambda/8$ wave-plate is misaligned by 1°.
Figure 4:
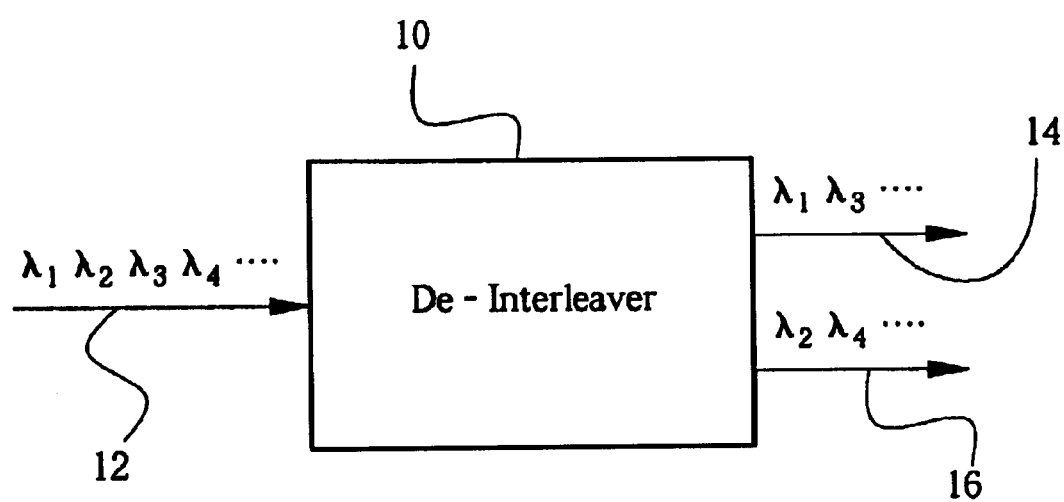
FIG. 4 is a block diagram illustrating the function of a deinterleaver.

FIG. 4 shows an optical deinterleaver and associated input and output signals. In FIG. 4, a deinterleaver 10 receives an input optical signal 12 containing a set of even channels and a set of odd channels, $\lambda_1, \lambda_2, \lambda_3$ and so on, and provides an output optical signal 14 containing the set of odd channels $\lambda_1, \lambda_3$ and so on, and provides a separate output optical signal 16 containing even channels $\lambda_2, \lambda_4$ and so on.

Figure 5:
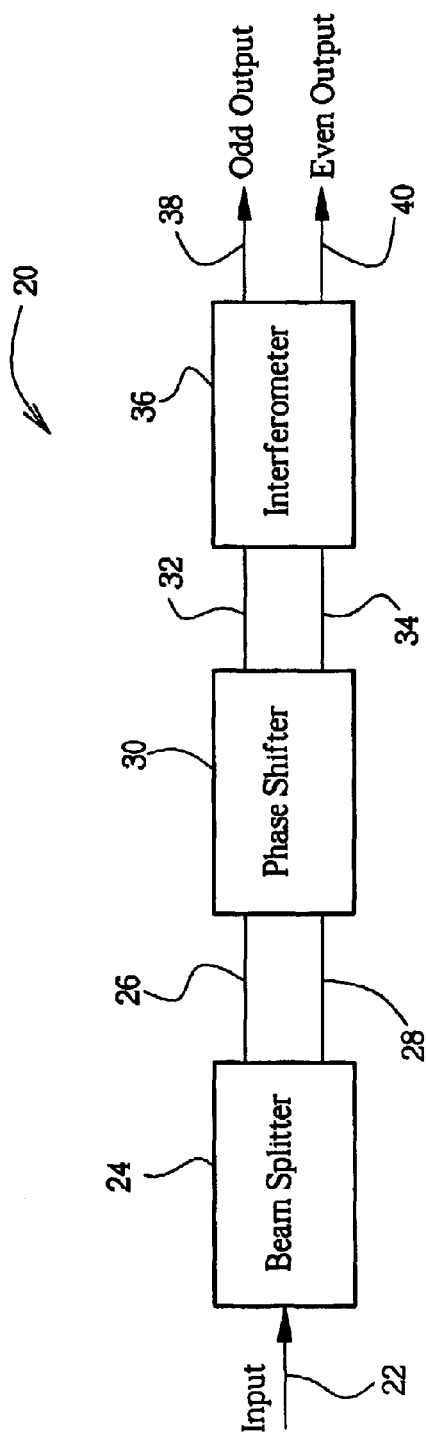
FIG. 5 shows the optical path of a Mach-Zehnder interferometer based deinterleaver.

FIG. 5 shows a schematic block diagram of a Mach-Zehnder based de-interleaver 20. An input light beam 22 enters beam splitter 24. The beam splitter 24 outputs two light beams 26 and 28. The power of the light beam 26 is approximately equal to the power of the light beam 28. The light beams 26 and 28 enter the phase shifter 30 and emerge as light beams 32 and 34 between which there is a phase difference. The two light beams 32 and 34 combine and interfere in the interferometer 36. From the interferometer 36, two output signals are obtained, output signal 38 containing odd channels, and output signal 40 containing even channels.

In the present invention, instead of using a beam splitter, a plane-polarized wave is decomposed into two orthonormally polarized waves between which there is a phase difference that is introduced by an interferometer. The phase difference is dependent on the wavelength of the optical signal and is a periodic function of wavelength, having a period that is equal to one or two channel spacings. The components of the orthonormally polarized waves which pass through a polarization beam-splitter (PBS) interfere and become output signals for odd channels. The components, which are reflected from the PBS, interfere and become output signals for even channels.

In the following derivation, there will be derived values of the parameters needed for making a GTIFR based deinterleaver or interleaver in accordance with the present invention, including reflectivity of the GTI partially reflective mirror and rotating angle values for the Faraday rotators.

Figure 6:
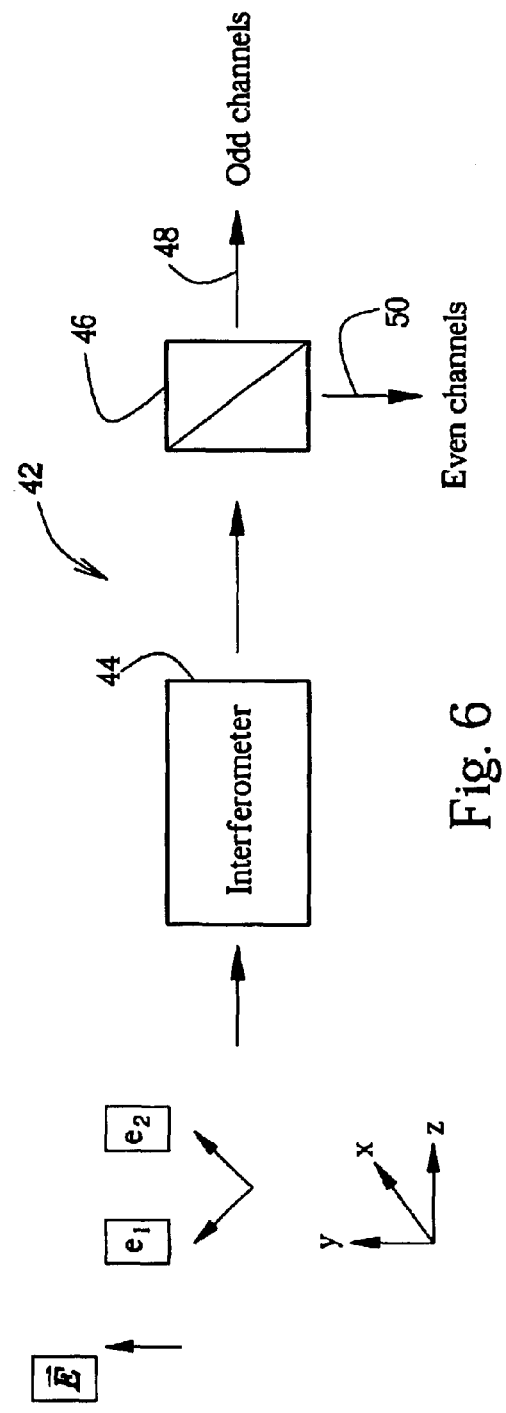
FIG. 6 shows optical path of a polarization-split interferometer based deinterleaver.

FIG. 6 shows a diagram of a deinterleaver 42. $\vec{E}$ is the polarization of a wave that has unit power and propagates in the positive z direction. $\vec{E}$ is parallel to the positive y-direction. The polarization $\vec{E}$ can be expressed as $$\vec{E} = \sum_{i=1}^{2} a_i \vec{e}_i. \tag{1}$$

The set of basis vectors $\vec{e}_i$ is orthonormal, i.e., $$e_i e_j^* = \delta_{ij} = \begin{cases} 1, i = j \\ 0, i \neq j \end{cases}. \tag{2}$$

Using Jones vectors, $\vec{E}$ can be expressed as $$\vec{E} = \begin{pmatrix} 0 \\ 1 \end{pmatrix} = a_1 \begin{pmatrix} e_{11} \\ e_{12} \end{pmatrix} + a_2 \begin{pmatrix} e_{21} \\ e_{22} \end{pmatrix}. \tag{3}$$

After the beams have passed through (or been reflected from) an interferometer 44, the beams $e_1$ and $e_2$ have phase shifts $\phi_1$ and $\phi_2$, respectively, and equation (3) becomes $$a_1 \begin{pmatrix} e_{11} \\ e_{12} \end{pmatrix} e^{i\phi_1} + a_2 \begin{pmatrix} e_{21} \\ e_{22} \end{pmatrix} e^{i\phi_2}. \tag{4}$$

In the following derivation, the discussion is limited to the symmetric case where $\alpha_1 = \alpha_2 = \alpha$. When the beams travel to the polarization beam splitter (PBS) 46, the p-wave (polarization parallel to the y-direction as in the input light beam) passes through the PBS 46 and the s-wave (with polarization parallel the x-direction, i.e., perpendicular to the polarization of the input light beam) is reflected by the diagonal plane of the PBS 46. The p-wave 48, carrying the odd channels, is output at one output port of the deinterleaver 42, and the s-wave 50, carrying the even channels, is output at another output port of the deinterleaver 42.

The p-wave can be represented by $$ae^{-i\frac{\phi_1+\phi_2}{2}}\left(e_{12}e^{i\frac{\Delta\phi}{2}} + e_{22}e^{-i\frac{\Delta\phi}{2}}\right)\begin{pmatrix} 0 \\ 1 \end{pmatrix} \tag{5}$$

and the s-wave can be represented by $$ae^{-i\frac{\phi_1+\phi_2}{2}}\left(e_{11}e^{i\frac{\Delta\phi}{2}} + e_{21}e^{-i\frac{\Delta\phi}{2}}\right)\begin{pmatrix} 1 \\ 0 \end{pmatrix} \tag{6}$$

where $\Delta\phi = \phi_1 - \phi_2$.

For the circularly polarized basis, where $$a = \frac{1}{\sqrt{2}},$$

$$e_{11} = -e_{21} = -\frac{i}{\sqrt{2}}, \text{ and}$$

$$e_{12} = e_{22} = \frac{1}{\sqrt{2}},$$

the p-wave is represented by $$e^{-i\frac{\phi_1+\phi_2}{2}} \cos\frac{\Delta\phi}{2} \tag{7}$$

and the s-wave is represented by $$e^{-i\frac{\phi_1+\phi_2}{2}}\sin\frac{\Delta\phi}{2} \tag{8}$$

For the plane-polarized basis, where, $$a = \frac{1}{\sqrt{2}}$$

$$e_{11} = e_{12} = e_{22} = \frac{1}{\sqrt{2}}, \text{ and}$$

$$e_{21} = -\frac{1}{\sqrt{2}},$$

the p-wave is represented by $$e^{-i\frac{\phi_1+\phi_2}{2}}\cos\frac{\Delta\phi}{2} \tag{9}$$

and the s-wave is represented by $$ie^{-i\frac{\phi_1+\phi_2}{2}}\sin\frac{\Delta\phi}{2}. \tag{10}$$

In order to make a deinterleaver (or interleaver) using the configuration as shown in FIG. 6, the phase difference $\Delta\phi$ should meet the following requirements: the change of $\Delta\phi$ with wavelength must be periodic, with the period being equal to one or two channel spacings, and the value of $\Delta\phi$ should be close to zero (or $\pm 2$ m$\pi$, where m is an integer) in one half of each period and close to $\pi$ (or $\pm(2\text{ m}+1)\pi$) in the other half of each period.

Figure 7A:
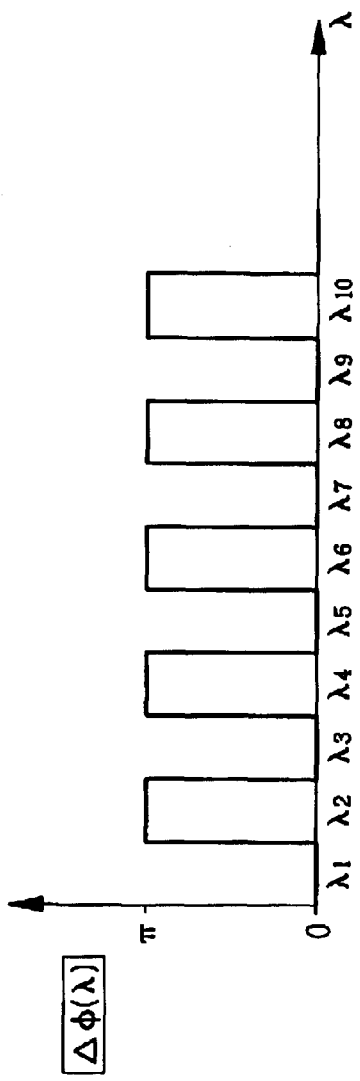
FIG. 7a is a graph showing phase difference $\Delta\phi(\lambda)$ versus $\lambda$ for an ideal deinterleaver.

FIG. 7a is a graph showing the phase difference $\Delta\phi(\lambda)$ versus $\lambda$ for an ideal case. Here $\Delta\phi(\lambda)$ is periodic with a period equal to two channel spacings.

Figure 7B:
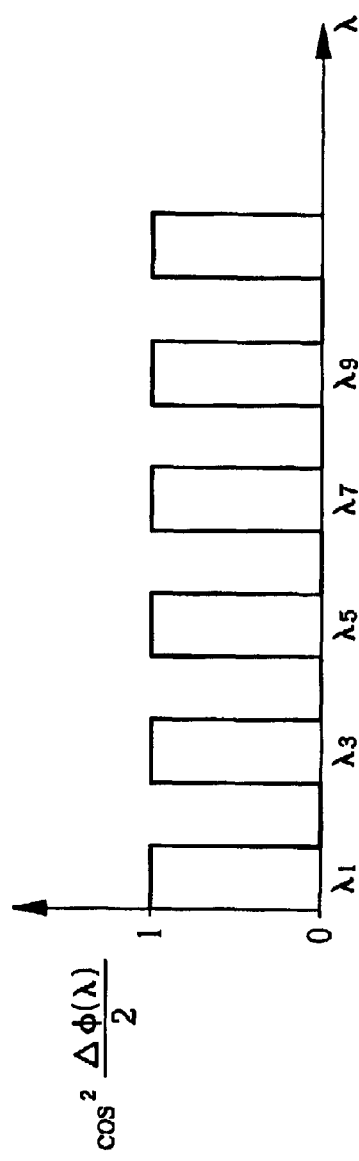
FIG. 7b is a graph showing the output of odd channels from an ideal deinterleaver.

FIG. 7b is a graph showing odd channel output versus wavelength for the ideal case.

Figure 7C:
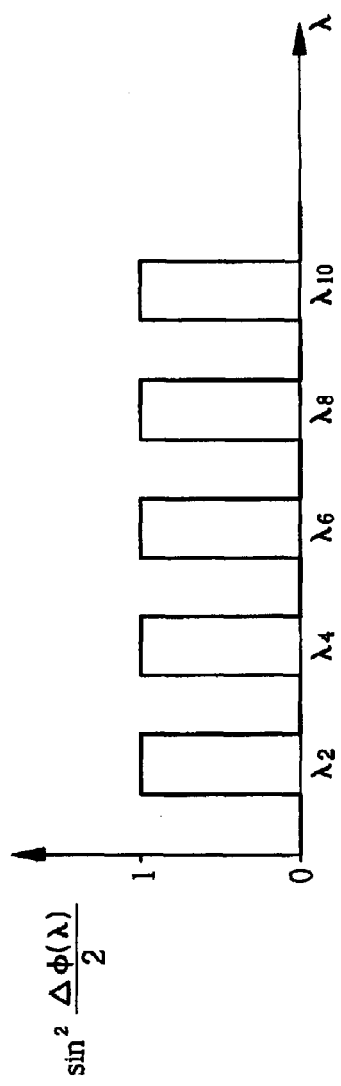
FIG. 7c is a graph showing the output of even channels from an ideal deinterleaver.

FIG. 7c is a graph showing even channel output versus wavelength for the ideal case.

Figure 8:
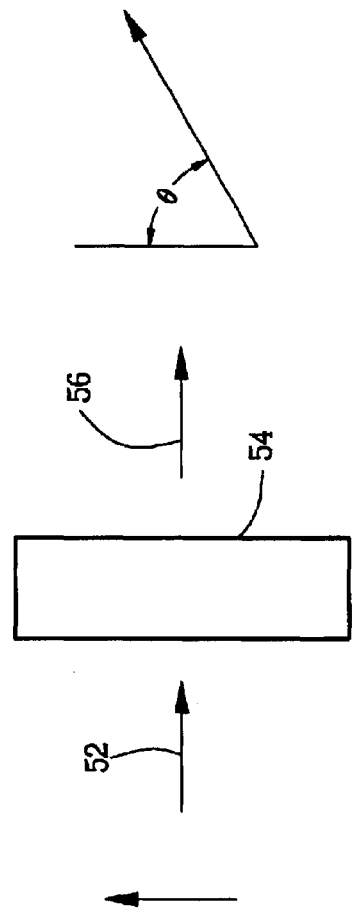
FIG. 8 is a schematic representation of the function of $\theta$-degree Faraday rotator.

The interferometer and phase shifter are key optical components that create phase difference $\Delta\phi$. For a circularly polarized wave the phase shifter is a Faraday rotator (FR). A $\theta$-degree FR rotates polarization of a plane-polarized wave, which passes through the FR by $\theta$ degrees, as illustrated in FIG. 8. The input wave 52 is plane polarized in a direction parallel to the y-axis. After passing through the $\theta$-degree Faraday rotator or garnet 54, the output wave 56 is polarized in a direction that is rotated $\theta$ degrees from the y-direction. According to equation (3), the plane-polarized wave in the FR can be decomposed into a right-circularly polarized component and a left-circularly polarized component. The wave traveling in the positive z-direction is given by $$\frac{1}{2}\begin{pmatrix}-i\\1\end{pmatrix}\exp\left[i\left(\omega t - \frac{2\pi}{\lambda}nz\right)\right] + \frac{1}{2}\begin{pmatrix}i\\1\end{pmatrix}\exp\left[i\left(\omega t - \frac{2\pi}{\lambda}nz\right)\right]. \tag{11}$$

Assuming that the right-circularly polarized wave sees an index of refraction $n_+$ and the left-circularly polarized wave sees an index of refraction $n_-$, then, upon leaving the Faraday rotator, the wave is described by $$\frac{1}{2}\begin{pmatrix}-i\\1\end{pmatrix}\exp\left[i\left(\omega t - \frac{2\pi}{\lambda}n_+d\right)\right] + \frac{1}{2}\begin{pmatrix}i\\1\end{pmatrix}\exp\left[i\left(\omega t - \frac{2\pi}{\lambda}n_-d\right)\right]. \tag{12}$$

This can be written as $$\frac{1}{2}\exp\left\{i\left[\omega t - (n_+ + n_-)\frac{\pi d}{\lambda}\right]\right\} \tag{13}$$

$$\left\{\begin{pmatrix}-i\\1\end{pmatrix}\exp\left[i(n_- - n_+)\frac{\pi d}{\lambda}\right] + \begin{pmatrix}i\\1\end{pmatrix}\exp\left[i(n_+ - n_-)\frac{\pi d}{\lambda}\right]\right\}$$

To interpret the physical meaning of equation (13), the equation is simplified by defining $$\varphi = \frac{\pi d}{\lambda}(n_+ + n_-) \text{ and } \theta = \frac{\pi d}{\lambda}(n_- - n_+).$$

With these definitions, equation (13) can be written as $$e^{i(\omega t - \varphi)}\left[\begin{pmatrix}0\\1\end{pmatrix}\left(\frac{e^{i\theta}+e^{-i\theta}}{2}\right) + \begin{pmatrix}1\\0\end{pmatrix}\left(\frac{e^{i\theta}-e^{-i\theta}}{2i}\right)\right] = \tag{14}$$

$$e^{i(\omega t - \varphi)}\left[\begin{pmatrix}0\\1\end{pmatrix}\cos\theta + \begin{pmatrix}1\\0\end{pmatrix}\sin\theta\right]$$

Equation (14) describes a plane-polarized wave with the polarization direction at an angle $$\theta = \frac{\pi d}{\lambda}(n_- - n_+) \tag{15}$$

The incident plane-polarized wave has had its plane of polarization rotated through an angle $\theta$. This also means that the right- and left-circularly polarized waves have phase delay $(\phi-\theta)$ and $(\phi+\theta)$, respectively, after the waves pass through the $\theta$-degree Faraday rotator.

Figure 9:
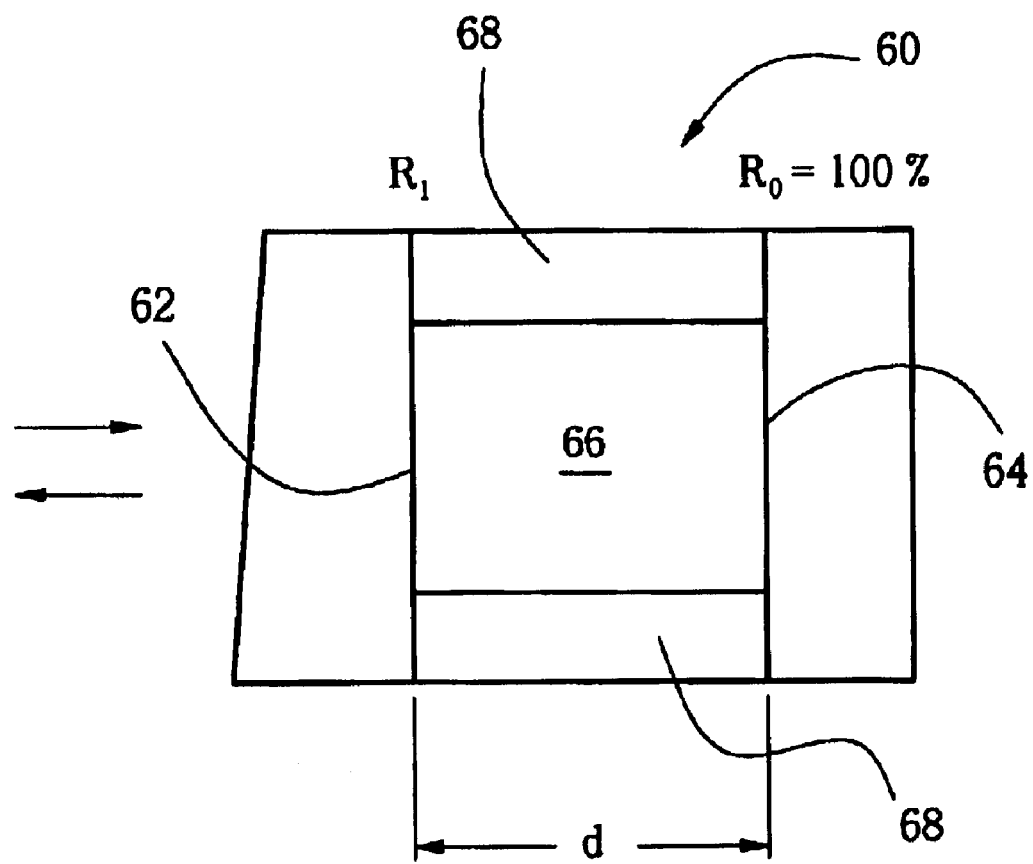
FIG. 9 shows a cross section of a Gires-Tournois interferometer (GTI).

FIG. 9 shows a schematic cross section of a Gires-Tournois interferometer (GTI). The Gires-Tournois interferometer 60 has a first mirror 62 which is partially reflective, having reflectivity $R_1$, and a second mirror 64, which is highly reflective, having reflectivity $R_0$. The reflectivity $R_0$ of the second mirror is approximately 100%. The partially reflective mirror 62 is spaced apart from and parallel to the highly reflective mirror 64. The space between the mirrors is the cavity 66 and the distance between the two mirrors is d. The first mirror 62 provides a single input/output port that allows light to be launched into and out of the cavity 66. The spacers 68 are made of ultra-low expansion material. The GTI is one of the best candidates for use as an interferometer in an interleaver because the amplitude response of a GTI is flat (i.e. independent of wavelength). The phase response of the GTI is periodic in $\lambda$ and is given by $$\psi(\lambda) = -2\tan^{-1}\left[\frac{1+\sqrt{R_1}}{1-\sqrt{R_1}}\tan\left(\frac{2\pi d}{\lambda}\right)\right], \tag{16}$$

where $\lambda$ is the wavelength, $R_1$ is the power reflectivity of the first mirror, d is the length of the cavity, and $$\frac{2\pi d}{\lambda}$$

is the single pass phase delay in the GTI cavity.

Figure 10:
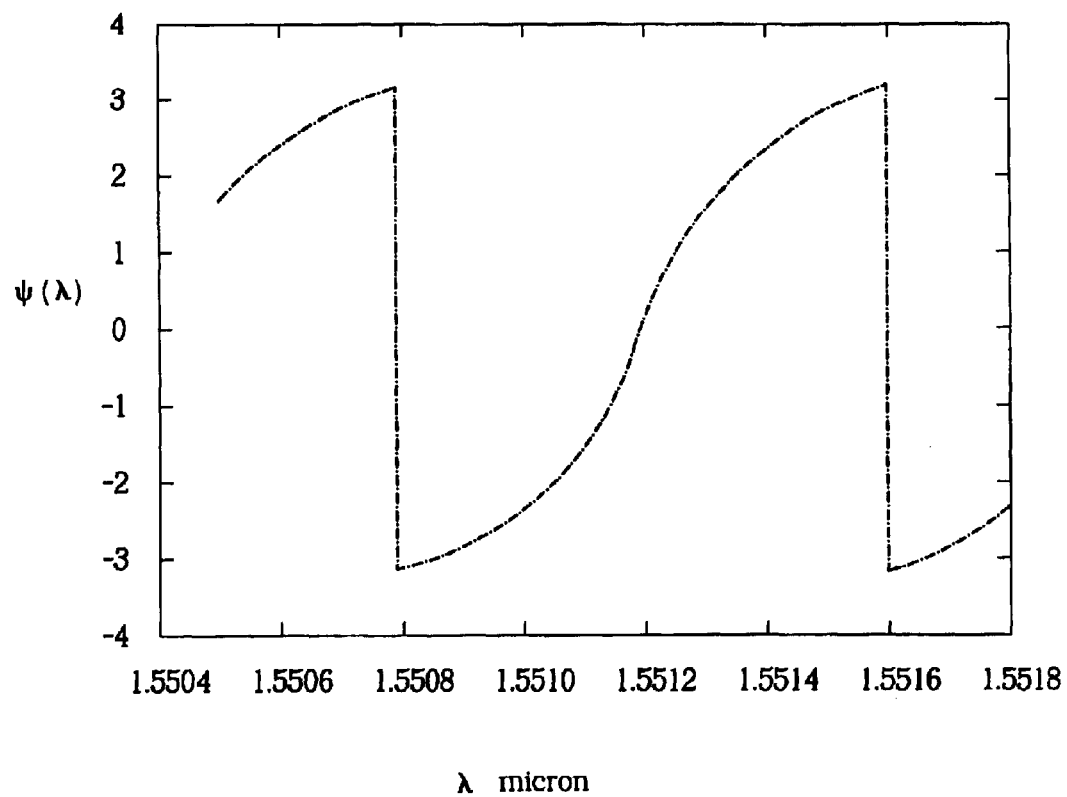
FIG. 10 is a graph of the phase response of a GTI.

FIG. 10 is a graph of equation (16) showing the phase response $\psi(\lambda)$ of a GTI as a function of wavelength $\lambda$.

Figure 11:
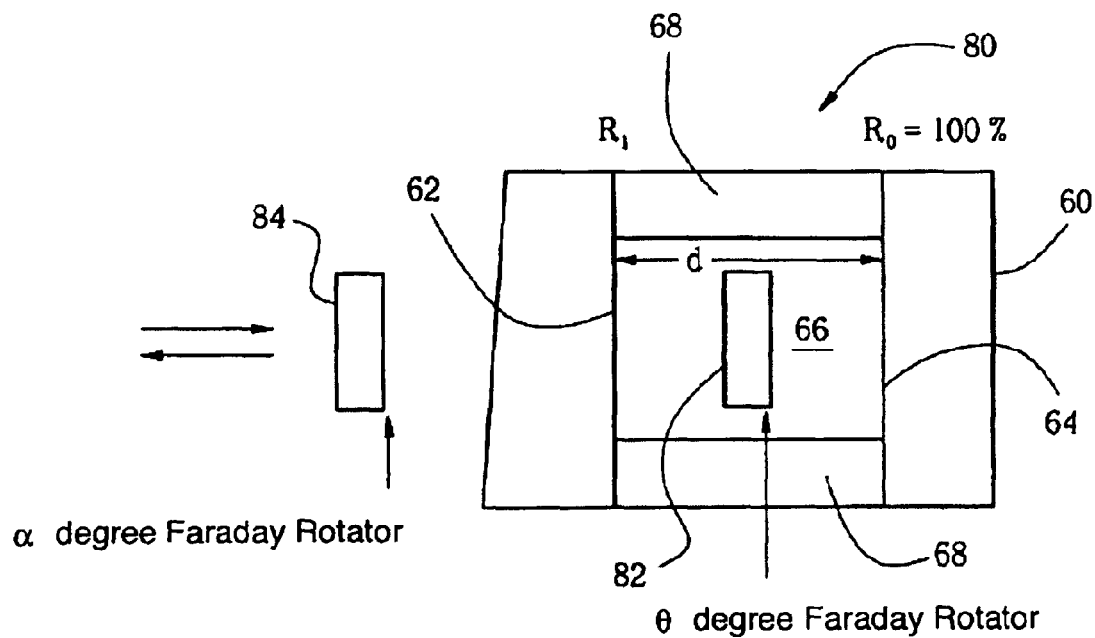
FIG. 11 is a cross section of a GTIFR in accordance with the present invention.

FIG. 11 is a schematic drawing showing a cross section of a GTIFR 80 in accordance with the present invention. The GTIFR 80 includes a GTI 60 having a first mirror 62 and a second mirror 64. The first mirror 62 is partially reflective and has reflectivity $R_1$. The second mirror 64 is highly reflective and has reflectivity $R_0$ of about 100%. The second mirror 64 is spaced apart from and parallel to the first mirror 62, the distance between the mirrors being the distance d in FIG. 11. Within the cavity 66 between the mirrors, there is a $\theta$-degree Faraday rotator 82. In front of the GTI there is an a degree Faraday rotator 84. After the right-circularly polarized and left circularly polarized waves are reflected from the GTI with $\theta$-degree Faraday rotator inside, the phase delays are $$\psi_{R,L}(\lambda) = -2\tan^{-1}\left[\frac{1+\sqrt{R_1}}{1-\sqrt{R_1}}\tan\left(\frac{2\pi d}{\lambda}+\varphi \mp \theta\right)\right], \quad (17)$$

where $$\frac{2\pi d}{\lambda}$$

in equation (16) is replaced by $$\left(\frac{2\pi d}{\lambda}+\varphi \mp \theta\right),$$

because the $\theta$ degree FR in the GTI causes additional phase delays ($\phi \mp \theta$) for the right-circularly polarized and left-circularly polarized waves that travel into the cavity of the GTI. When the right-circularly polarized wave and the left-circularly polarized wave travel through the $\alpha$-degree FR from left to right, then reflect back from the GTI, with the $\theta$ degree FR inside, and pass through the $\alpha$ degree FR from right to left, the total phase delays for the right and left circularly polarized waves are $$\psi_{R,L} = -2\tan^{-1}\left[\frac{1+\sqrt{R_1}}{1-\sqrt{R_1}}\tan\left(\frac{2\pi d}{\lambda}+\varphi \mp \theta\right)\right] \mp 2\alpha. \quad (18)$$

The phase difference $\Delta\phi$ between the right and left circularly polarized waves is $$\Delta\phi(\lambda) = -2\tan^{-1}\left[\frac{1+\sqrt{R_1}}{1-\sqrt{R_1}}\tan\left(\frac{2\pi d}{\lambda}+\varphi-\theta\right)\right] + \quad (19)$$

$$2\tan^{-1}\left[\frac{1+\sqrt{R_1}}{1-\sqrt{R_1}}\tan\left(\frac{2\pi d}{\lambda}+\varphi+\theta\right)\right] - 4\alpha.$$

The effective length of the GTI cavity is defined as L so that $$\frac{2\pi L}{\lambda} = \frac{2\pi d}{\lambda}+\varphi. \quad (20)$$

Using equation (20) in equation (19), equation (19) becomes $$\Delta\phi(\lambda) = -2\tan^{-1}\left[\frac{1+\sqrt{R_1}}{1-\sqrt{R_1}}\tan\left(\frac{2\pi L}{\lambda}-\theta\right)\right] + \quad (21)$$

$$2\tan^{-1}\left[\frac{1+\sqrt{R_1}}{1-\sqrt{R_1}}\tan\left(\frac{2\pi L}{\lambda}+\theta\right)\right] - 4\alpha.$$

Figure 12:
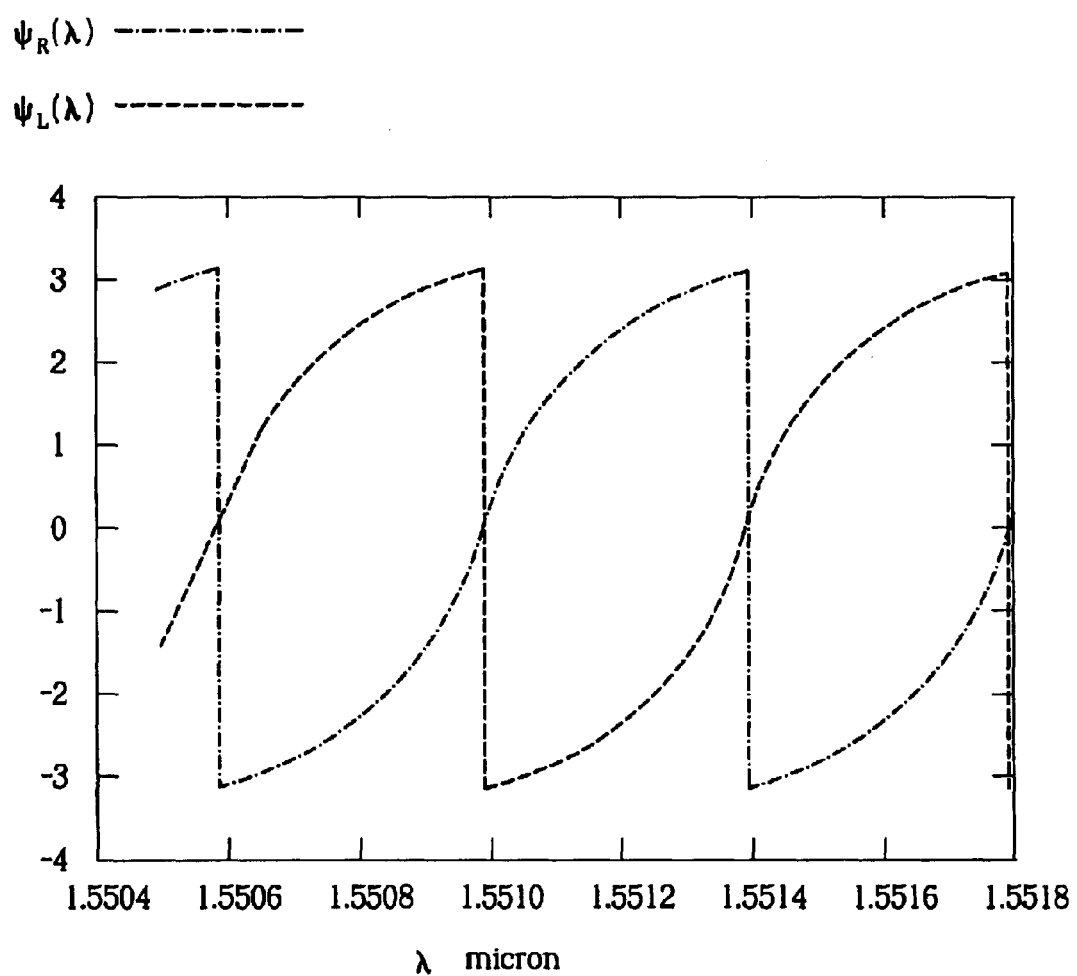
FIG. 12 is graph of the right-circularly polarized wave phase delay $\psi_R(\lambda)$ and left-circularly polarized wave phase-delay $\psi_L(\lambda)$ for a GTIFR.

The values of $R_1$, $\theta$, $\alpha$, and L in equation (21) must be such that $\Delta\phi(\lambda)$ meets the requirements set forth herein above with regard to FIG. 6 and equations (7) and (8). The effective length L of the GTI cavity is determined by the channel spacing of the interleaver. For a 50 GHz interleaver, L is 1.5 mm. $\theta$ is a value of phase shift of the curve $\psi(\lambda)$ (equation (16) in FIG. 10. If $\psi_R(\lambda)$ and $\psi_L(\lambda)$ are offset from each other by $\pi/2$, as shown in FIG. 12, $\Delta\phi$ is symmetric for odd and even channels. This requires that $2\theta=\pi/2$ or $\theta=\pi/4$.

Because cosine and sine functions are periodic and one period extends from $-\pi$ to $+\pi$, $\Delta\phi$ in equations (7) and (8) can be limited to the range $-2\pi$ to $+2\pi$. Select center wavelengths $\lambda_1$ and $\lambda_2$ of two adjacent channels so that $$\frac{2\pi L}{\lambda_1} = 2m\pi \text{ and } \frac{2\pi L}{\lambda_2} = 2m\pi + \frac{\pi}{2}$$

(where m is a positive integer). Referring to FIG. 7a, $\Delta\phi(\lambda_1)$ can be $\pi$ or $-\pi$ and $\Delta\phi(\lambda_2)$ can be $2\pi$, 0 or $-2\pi$. Substituting $$\theta = \pi/4, \frac{2\pi L}{\lambda_1} = 2m\pi \text{ and } \Delta\phi(\lambda_1) = \pi$$

into equation (21) gives $$4\tan^{-1}\left[\frac{1+\sqrt{R_1}}{1-\sqrt{R_1}}\right] - 4\alpha = \pi. \quad (22)$$

Substituting $$\theta = \pi/4, \frac{2\pi L}{\lambda_2} = 2m\pi + \frac{\pi}{2}, \text{ and } \Delta\phi(\lambda_2) = -2\pi$$

into equation (21) gives $$4\tan^{-1}\left[\frac{1+\sqrt{R_1}}{1-\sqrt{R_1}}\right] + 4\alpha = 2\pi \quad (23)$$

Adding and subtracting equations (22) and (23) gives $$\tan^{-1}\left[\frac{1+\sqrt{R_1}}{1-\sqrt{R_1}}\right] = \frac{3}{8}\pi \text{ and} \quad (24)$$

$$8\alpha = \pi \quad (25)$$

Equations (24) and (25) give $R_1=17.2\%$ and $\alpha=\pi/8$ (22.5°). Note that, for $\Delta\phi(\lambda_1)=-\pi$ and $\Delta\phi(\lambda_2)=2\pi$ or 0, the values obtained for $R_1$ and $\alpha$ have no physical meaning.

The derivation above gives values for all of the parameters needed for making a deinterleaver or interleaver. These values are as follows:

1. The reflectivity of the first mirror of the GTI $R_1=17.2\%$
2. The reflectivity of the second mirror of the GTI $R_0=100\%$ 3. θ-degree FR inside the GTI cavity θ=45°
4. α-degree FR in front of the GTI α=22.5°

Figure 13:
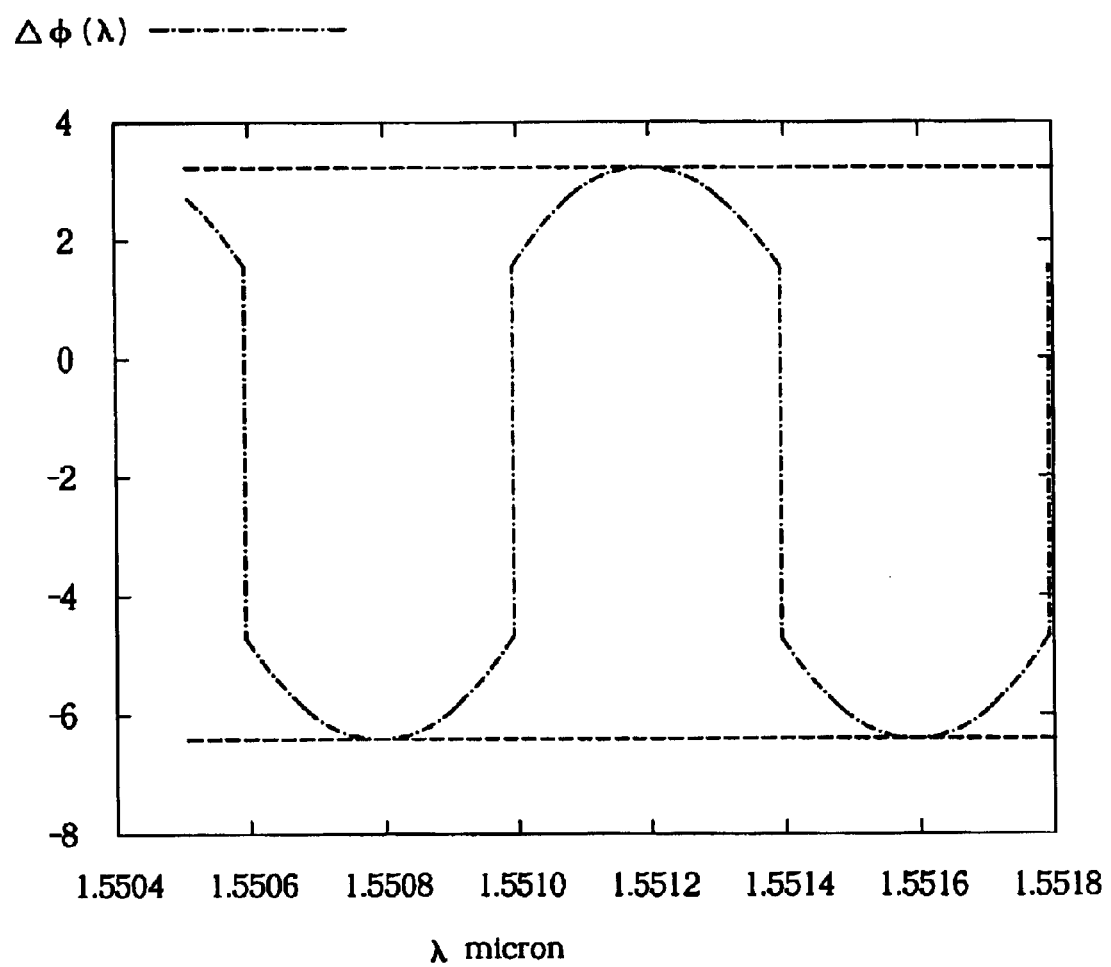
FIG. 13 is a graph of phase difference $\Delta\phi(\lambda)$ between the right-circularly and left-circularly polarized waves for a GTIFR.

FIG. 13 is a graph of equation (21) showing the phase difference Δϕ(λ), as a function of λ, for the GTIFR of FIG. 11, using these derived parameter values and L=1.5 mm.

The phase shift for this interleaver or deinterleaver is given by $$\psi_1(\lambda) = -\tan^{-1}\left[\frac{1+\sqrt{R_1}}{1-\sqrt{R_1}}\right]\tan\left(\frac{2\pi L}{\lambda} - \frac{\pi}{4}\right) - \tan^{-1}\left[\frac{1+\sqrt{R_1}}{1-\sqrt{R_1}}\right]\tan\left(\frac{2\pi L}{\lambda} + \frac{\pi}{4}\right) \quad (26)$$

Figure 14:
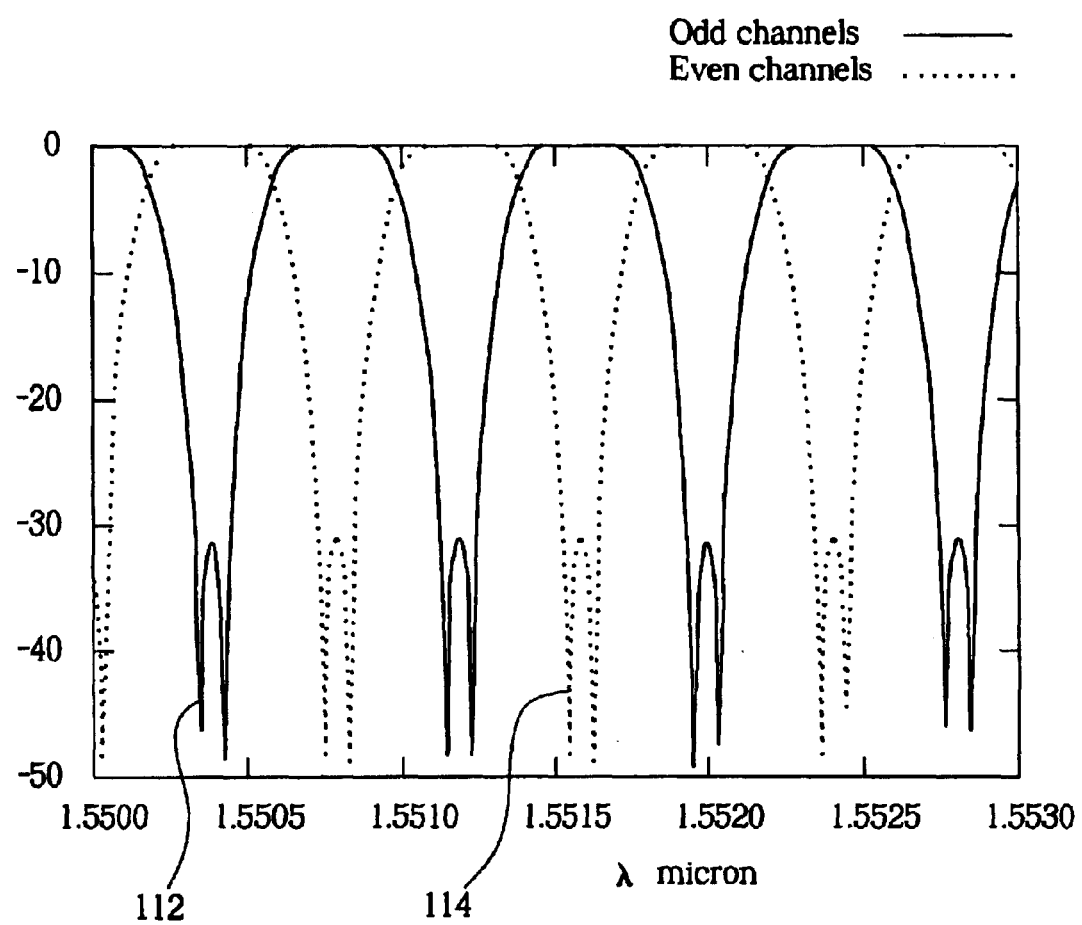
FIG. 14 is a graph of the signal output of odd and even channels of a GTIFR based deinterleaver.

Substituting equation (21) for Δϕ in equations (7) and (8), the signal output for odd channels $$\left(\cos\frac{\Delta\phi(\lambda)}{2}\right)^2$$

and for even channels $$\left(\sin\frac{\Delta\phi(\lambda)}{2}\right)^2$$

can be calculated. FIG. 14 shows the results of this substitution. In FIG. 14 the reflectivity $R_1$ is 18.5% rather than the 17.2% derived above. Changing the reflectivity $R_1$ from 17.2% to 18.5% increases the isolation at pass band edges of adjacent channels up to 25 dB. In FIG. 14, the solid trace 112 represents the odd channels and the dashed trace 114 represents the even channels.

If, in the above discussion, the plane-polarized basis had been used instead of the circularly polarized basis, the result would have been a λ/4 wave-plate in place of the 45° Faraday rotator inside the GTI and a λ/8 wave-plate in place of the 22.5° Faraday rotator in front of the GTI. This arrangement of GTI and wave-plates is described in U.S. Pat. No. 6,169,604, entitled, "NONLINEAR INTERFEROMETER FOR FIBER OPTIC DENSE WAVELENGTH DIVISION MULTIPLEXER UTILIZING A PHASE BIAS ELEMENT TO SEPARATE WAVELENGTHS IN AN OPTICAL SIGNAL".

Starting with equation (4) the derivation of equations (7) through (10) and (26) was limited to the symmetric case by setting $\alpha_1=\alpha_2=\alpha$. This limitation and these equations are automatically correct no matter how the Faraday rotators are aligned relative to the direction of polarization of the light that is incident on the Faraday rotators. In the case of wave-plates, however, $\alpha_1 \neq \alpha_2$ and the equations are not correct when the c-axis of a wave plate is misaligned relative to the direction of polarization. When $\alpha_1 \neq \alpha_2$, the equations become very complicated and show distortions in spectrum shape and group delay of the NLI based interleaver and deinterleaver.

Figure 15:
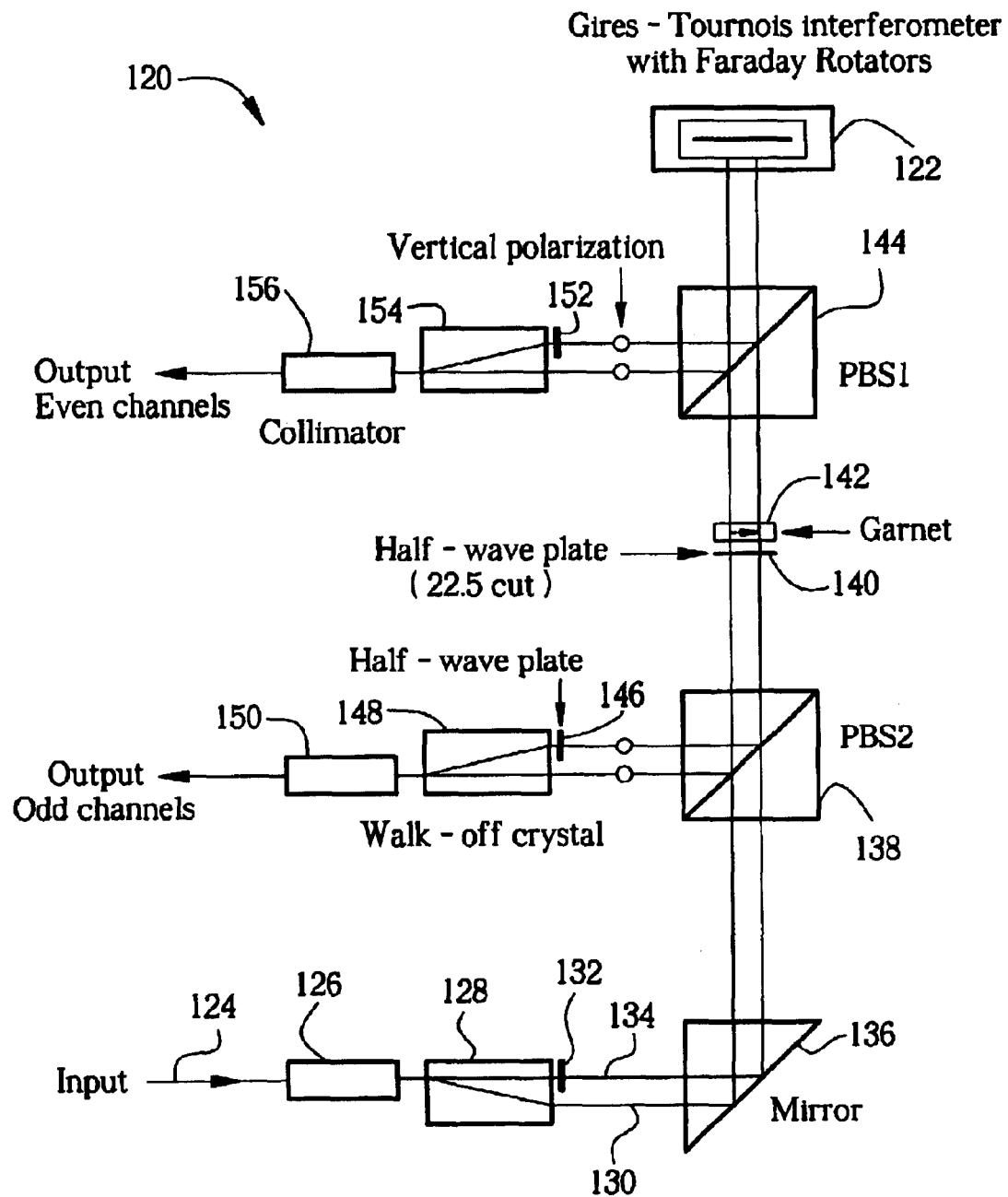
FIG. 15 is a schematic diagram of a GTIFR based deinterleaver in accordance with the present invention.

FIG. 15 is a schematic drawing of a deinterleaver in accordance with the present invention. The deinterleaver 120 includes one Gires Tournois interferometer with Faraday Rotators, GTIFR 122. The GTIFR 122 is as shown in FIG. 11. The input optical signal 124 carries optical signals for even and odd channels. Collimator 126 collimates the signal beam. Walk-off crystal 128 separates the beam from the collimator 126 into a vertically polarized beam and a horizontally polarized beam 130. The vertically polarized beam passes through a half-wave plate 132 and emerges from the half-wave plate as a horizontally polarized beam 134. The mirror 136 reflects the two horizontally polarized beams to a polarization beam splitter (PBS) 138. Both horizontally polarized signals pass through PBS 138, through 22.5 cut half-wave plate 140 (which rotates the polarization of the signals a positive 45 degrees), through garnet 142 (which rotates the polarization of the signals a negative 45 degrees), and through PBS 144 to GTIFR 122. The signals entering the GTIFR 122 are horizontally polarized. The signal carrying odd channels is reflected from GTIFR 122 with horizontal polarization and passes through PBS 144, then through garnet 142 which rotates the polarization of horizontally polarized signals through 45 degrees, and then through 22.5 cut half-wave plate 140 which rotates the polarization through another 45 degrees, thus making the odd channel signal vertically polarized. PBS 138 reflects the vertically polarized odd channel signal. After reflection in PBS 138, a portion of the vertically polarized odd channel signal passes through half-wave plate 146 and emerges with horizontal polarization and enters the walk-off crystal 148. Another portion of the signal reflected from PBS 138 enters the walk-off crystal directly. The walk-off crystal combines the vertically polarized portion with the horizontally polarized portion to provide an output signal carrying the odd channels to collimator 150.

The signal carrying even channels emerges from the GTIFR 122 and is reflected by PBS 144. After reflection from PBS 144, the even channel signal has vertical polarization. After reflection from PBS 144, part of the vertically polarized light passes through half-wave plate 152 (where the direction of polarization is changed to horizontal) into walk-off crystal 154 and part goes directly into the walk-off crystal 154. Walk-off crystal 154 combines the two portions to provide an output signal carrying the even channels to collimator 156.

If, in the GTIFR 122 in FIG. 15, the external Faraday rotator is replaced with a Faraday rotator having magnetic field direction switched, α becomes −α and so Δϕ(λ) in equation (21) changes by π and $$\left(\cos\frac{\Delta\phi(\lambda)}{2}\right)^2$$

becomes $$\left(\sin\frac{\Delta\phi(\lambda)}{2}\right)^2$$

and vice versa. The output signal locations are changed, with an output signal for odd channels appearing at collimator 156 and the output signal for even channels appearing at collimator 150.

Figure 15A:
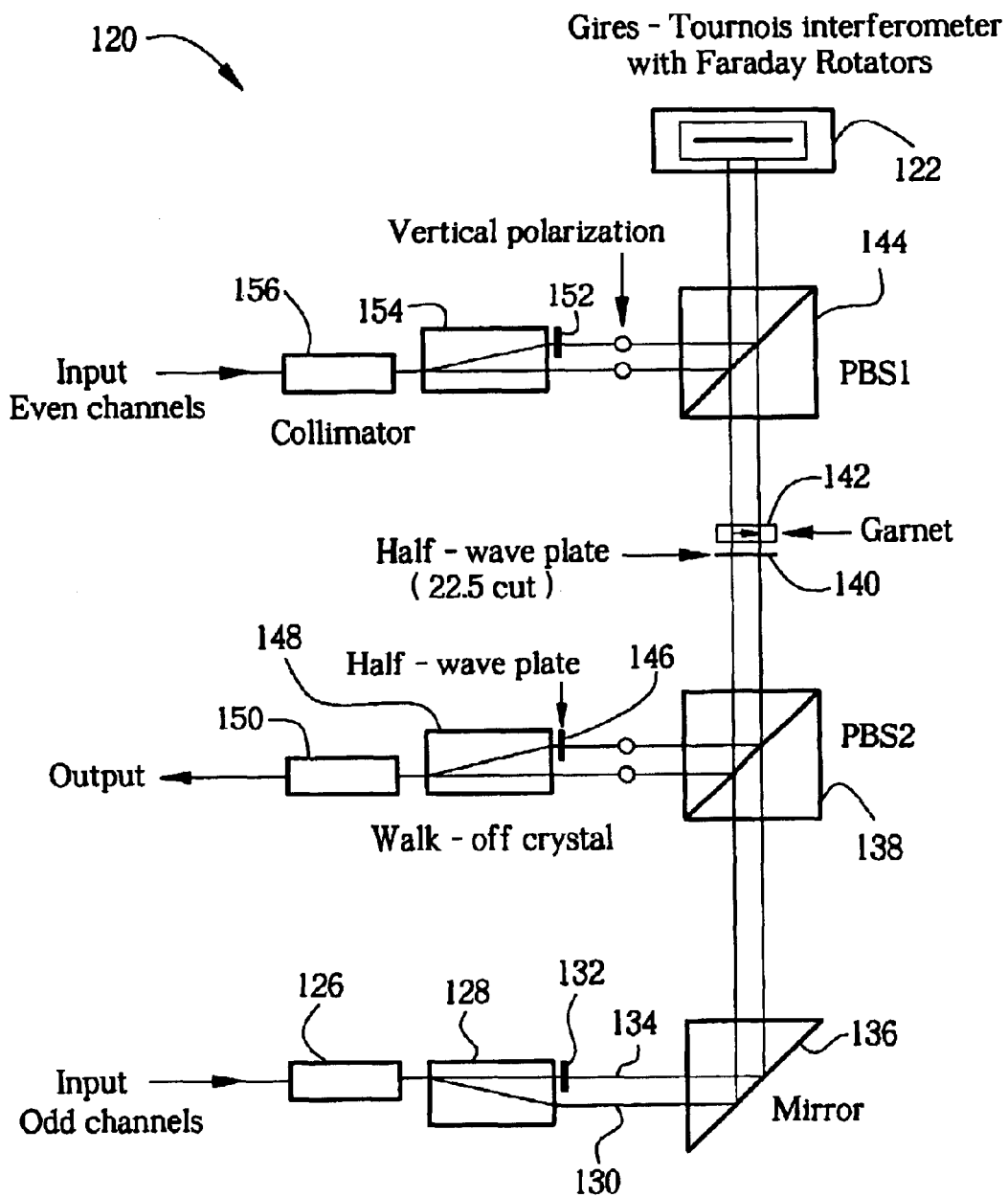
FIG. 15A is a schematic diagram of a GTIFR based interleaver in accordance with the present invention.

FIG. 15A is a schematic drawing of an interleaver in accordance with the present invention. The interleaver 120 of FIG. 15A is the same device as the deinterleaver of FIG. 15. The interleaver of FIG. 15A receives an odd channel input signal via collimator 126 and receives an even channel signal through collimator 156 and outputs the combined signals for odd and even channels at collimator 150.

The odd channel signal passes through collimator 126 and walk-off crystal 128. Walk-off crystal 128 divides the odd channel input signal into a horizontally polarized portion 130 and a vertically polarized portion which passes through half-wave plate 132 to become horizontally polarized portion 134. The horizontally polarized odd channel signal is then reflected in mirror 136 and then passes through PBS 138, 22.5 cut half-wave plate 140, garnet 142, and PBS 144 into GTIFR 122. GTIFR 122 reflects the horizontally polarized signals of the odd channels.

The even channel input signal passes through collimator 156 and through walk-off crystal 154, which divides the signal into a vertically polarized portion, which passes, directly to PBS 144, and a horizontally polarized portion, which passes through half-wave plate 152 and continues as vertically polarized to PBS 144. Both vertically polarized portions of the even channel signal are reflected by PBS 144 into GTIFR 122.

Both the even channel signal and the odd channel signal leave the GTIFR 122 and pass through PBS 144, through garnet 142 which rotates the polarization of horizontally polarized signals through 45 degrees, and through 22.5 cut half-wave plate 140 which rotates the polarization through another 45 degrees, thus making both the odd channel signal and even channel signal vertically polarized. The vertically polarized signals are reflected by PBS 138. A portion of the signals passes through half-wave plate 146 and becomes horizontally polarized and then enters walk-off crystal 148. The remainder of the signals passes directly from PBS 138 to walk-off crystal 148. The walk-off crystal 148 combines the vertically polarized signal with the horizontally polarized signal and outputs an output signal containing odd and even channels via collimator 150.

Figure 16:
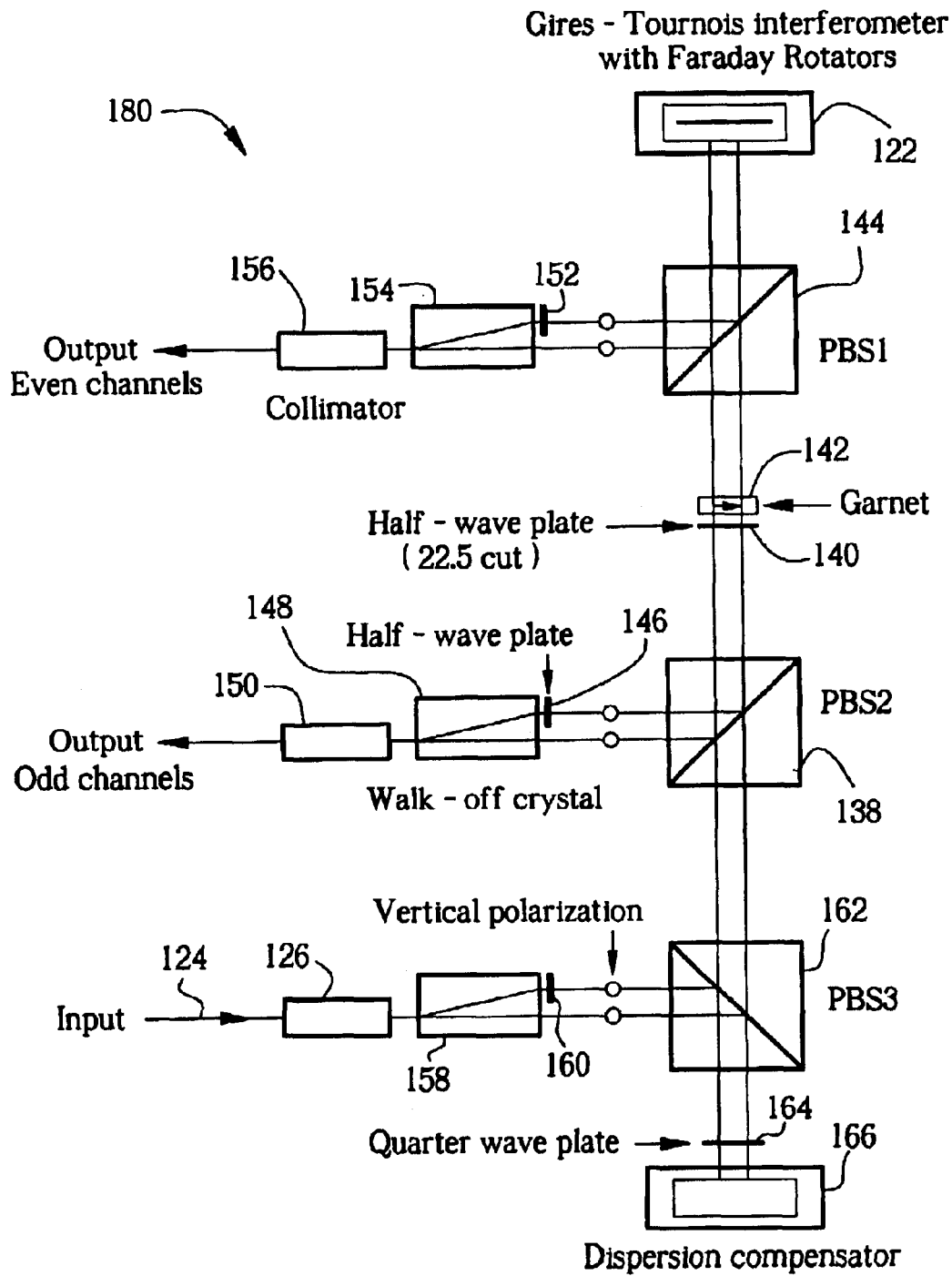
FIG. 16 is a schematic diagram of a GTIFR based deinterleaver with dispersion compensator in accordance with the present invention.

FIG. 16 is a schematic drawing showing a deinterleaver with dispersion compensation, in accordance with the present invention. The input signal contains odd channels and even channels. Collimator 126 collimates input signal 124. Walk-off crystal 158 separates the input signal into a vertically polarized signal and a horizontally polarized signal. The half-wave plate 160 converts the horizontally polarized signal to vertical polarization so that the input signal is vertically polarized. The PBS 162 reflects the vertically polarized input signal to quarter wave-plate 164, which transforms the plane-polarized signal to a circularly polarized signal. The circularly polarized signal travels to the dispersion compensator 166, which changes the phase of the signals by $\psi_c(\lambda)$. The signal reflected from the dispersion compensator 166 passes again through the quarter wave-plate 164, which now transforms the circularly polarized signal to a plane-polarized signal, polarized in the horizontal direction. The horizontally polarized signal passes through PBS 162, PBS 138, 22.5 cut half-wave plate 140 (which rotates the polarization through 45° in a positive sense), garnet 142 (which rotates the polarization of the signals through 45° in a negative sense), and PBS 144 to GTIFR 122. The signal reflected from GTIFR 122 contains a horizontally polarized odd channel signal and a vertically polarized even channel signal.

The horizontally polarized odd channel signal passes through PBS 144, garnet 142 (which rotates the horizontally polarized signal through 45 degrees), and 22.5 cut half-wave plate 140 (which rotates the polarization another 45°) and emerges as a vertically polarized odd channel signal, which is reflected by PBS 138. A portion of the vertically polarized signal reflected from PBS 138 passes through half-wave plate 146 and enters walk-off crystal 148 as a horizontally polarized signal. Another portion of the vertically polarized signal reflected from PBS 138 enters the walk-off crystal directly. The walk-off crystal combines the two portions into an odd channel output signal which passes through collimator 150.

The vertically polarized even channel signal from GTIFR 122 is reflected by PBS 144 to walk-off crystal 154. A portion of the signal is changed to horizontal polarization by half-wave plate 152 before entering the walk-off crystal 154. The walk-off crystal combines the horizontally polarized portion with the vertically polarized portion and outputs an output signal carrying the even channels through collimator 156.

Figure 17:
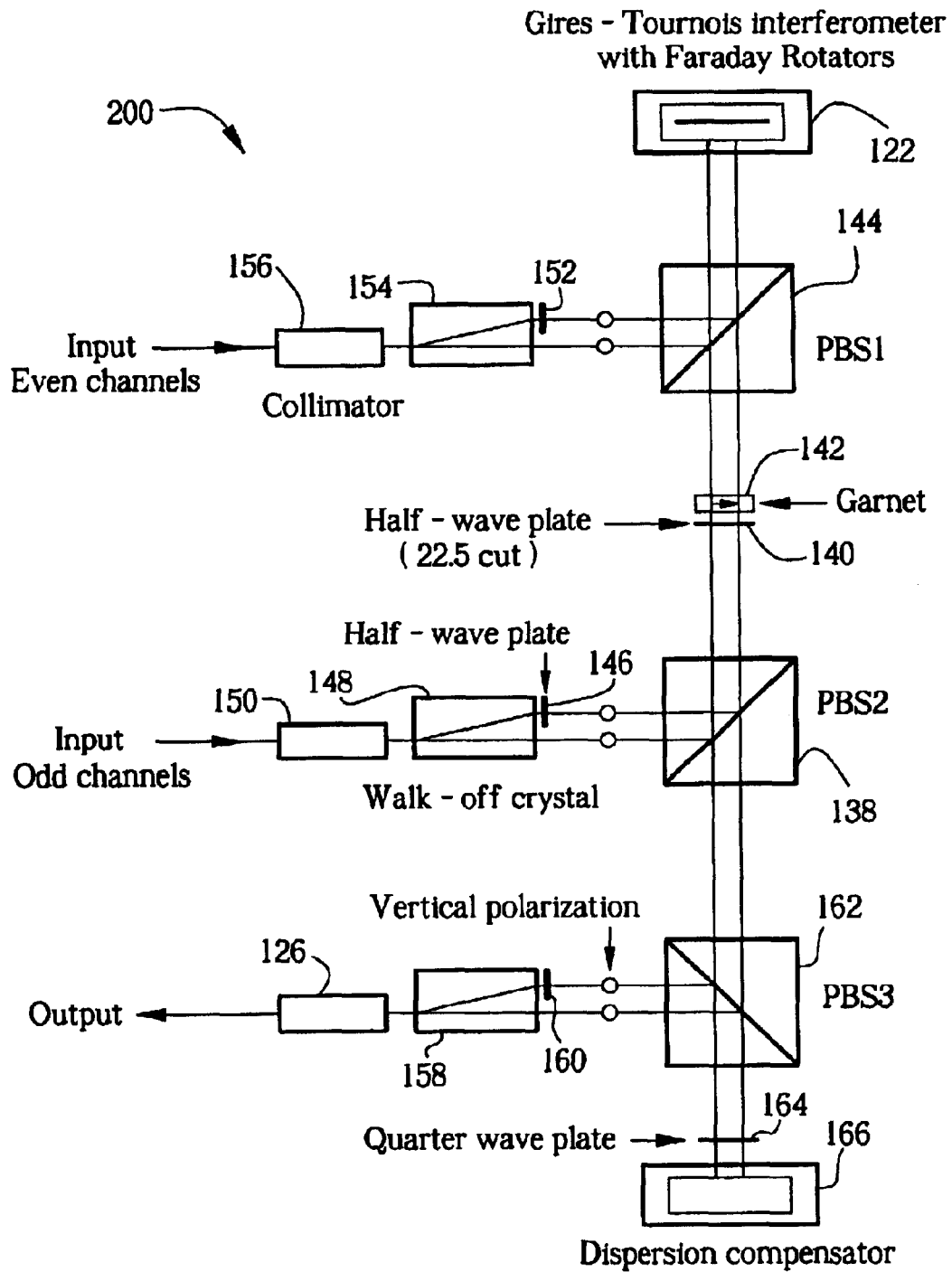
FIG. 17 is a schematic diagram of a GTIFR based interleaver with dispersion compensator in accordance with the present invention.

FIG. 17 is a schematic drawing of a dispersion compensated interleaver 200 in accordance with the present invention. The interleaver 200 of FIG. 17 differs from the deinterleaver 180 of FIG. 16 only in that the garnet 142 is rotated 180° about an axis perpendicular to the page. Thus, if the garnet 142 in FIG. 16 rotates the polarization of the light by 45° in a positive sense, the garnet 142 in FIG. 17 rotates the polarization 450 in a negative sense. Collimator 150 collimates the odd channel input signal. The walk-off crystal 148 and half-wave plate 146 change the signal to a vertically polarized signal. PBS 138 reflects the vertically polarized input signal for odd channels to the half-wave plate 140. The odd channel signal passes through the half-wave plate 140 which rotates the polarization of the signal by 45°, and through the garnet 142 which rotates the polarization another 45° so that the odd channel signal becomes horizontally polarized and passes through the PBS 144 to the GTIFR 122. The odd channel signal retains horizontal polarization when reflected by GTIFR 122 and then passes through PBS 144, through garnet 142 which rotates the horizontally polarized signal by 45° in one sense, through half-wave plate 140 which rotates the polarization by 45° in the opposite sense, so that the horizontally polarized signal passes through PBS 138 and PBS 162 to quarter wave-plate 164. Quarter wave-plate 164 transforms the plane-polarized signal to a circularly polarized signal. The circularly polarized signal travels to the dispersion compensator 166 which changes the phase of the signal by $\psi_c(\lambda)$ as given by equation (28). After reflection by the dispersion compensator 166, the signal passes again through the quarter wave-plate 164, where the circularly polarized signal becomes plane polarized in the vertical direction. The vertically polarized signal is reflected by PBS 162 to half wave-plate 160 and walk-off crystal 158. The half-wave plate 160 changes the polarization direction of a portion of the signal to the horizontal direction and the walk-off crystal combines this with the remainder vertically polarized portion and sends an output signal carrying the odd channels to collimator 126, the common output port.

The input signal carrying even channels is changed to a vertically polarized signal by the action of the walk-off crystal 154 and the half wave-plate 152 and is then reflected by PBS 144 into GTIFR 122. After the signal has been reflected by the GTIFR, the polarization of the signal is horizontal and the signal travels to the dispersion compensator and from there to the common out port in the same manner as the odd channel signal as described above. The common output port, collimator 126 outputs the combined signals for all channels with dispersion compensation.

In the de-interleaver of FIG. 16 and in the interleaver of FIG. 17, a Faraday rotator with external magnetic field may replace the garnet 142. Changing the direction of the external magnetic field is sufficient to change from interleaver to de-interleaver or vice versa.

The total phase shift of the dispersion compensated deinterleaver of FIG. 16 and the dispersion compensated interleaver of FIG. 17 is given by $$\psi_T(\lambda) = \psi_I(\lambda) + \psi_C(\lambda) \tag{27}$$

where $\psi_1(\lambda)$ is the phase of the output signals from the GTIFR interleaver or deinterleaver as given by equation (26) without dispersion compensation, and $\psi_C(\lambda)$ is the phase response of the dispersion compensator 166. The dispersion compensator 166 is a Gires Tournois interferometer as shown in FIG. 9 for which the phase response is given by $$\psi_C = -2\tan^{-1}\left[\frac{1+\sqrt{R_2}}{1-\sqrt{R_2}}\tan\left(\frac{2\pi d}{\lambda}\right)\right] \qquad (28)$$

The group delay of the dispersion compensator 166 is given by $$\tau(\lambda) = \frac{0.01\lambda^2}{6\pi}\frac{d\,\psi_C(\lambda)}{d\,\lambda}, \qquad (29)$$

and the dispersion $D(\lambda)$ in units of ps/nm is given by $$D(\lambda) = 10^{-3}\frac{d\,\tau(\lambda)}{d\,\lambda}. \qquad (30)$$

Figure 18:
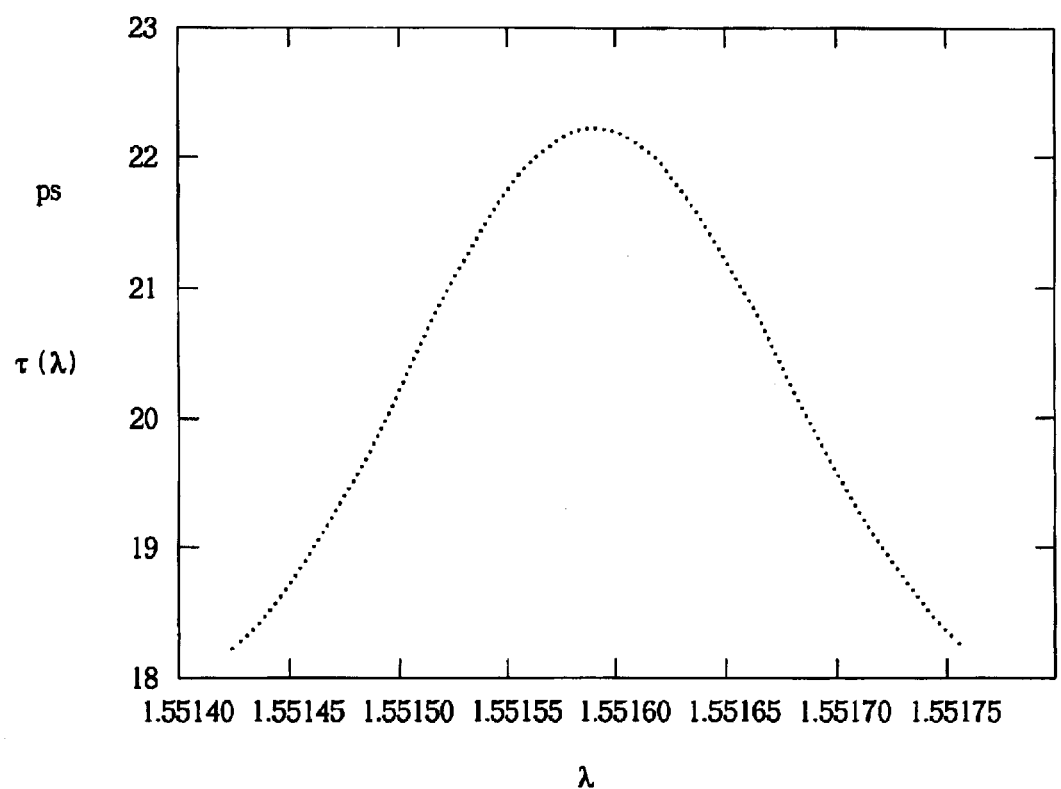
FIG. 18 is a graph of the group delay τ(λ) of a GTI dispersion compensator.

FIG. 18 is a graph of the group delay $\tau(\lambda)$ in picoseconds versus wavelength $\lambda$ in microns, as given by equation (29) for a dispersion compensator 166.

Figure 19:
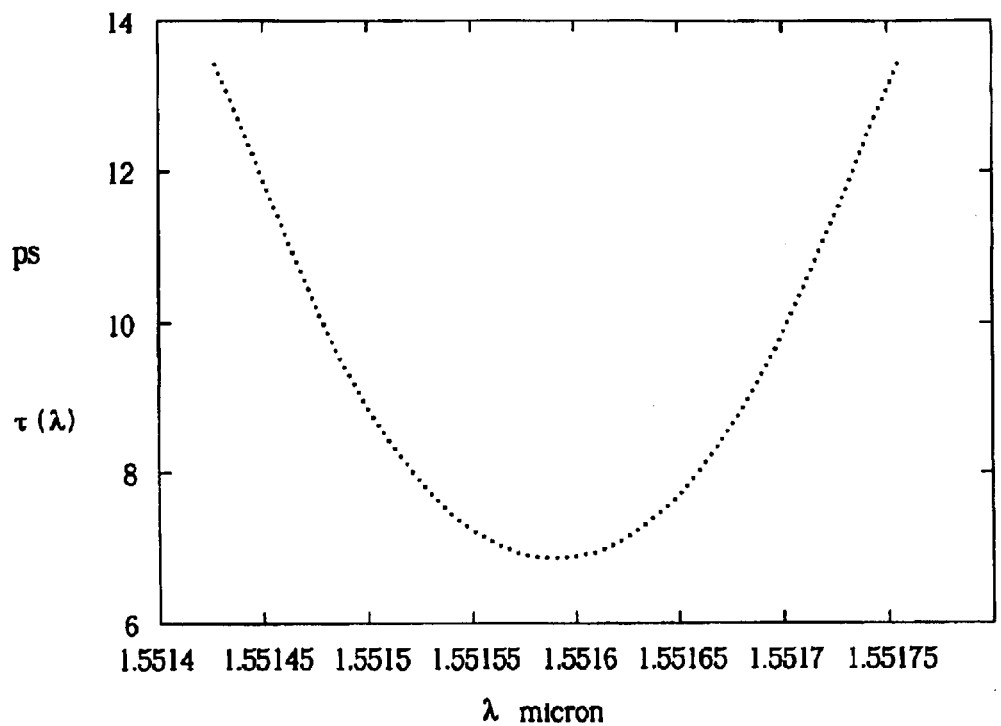
FIG. 19 is a graph of the group delay of the GTIFR based 50 GHz interleaver in accordance with the present invention.
Figure 20:
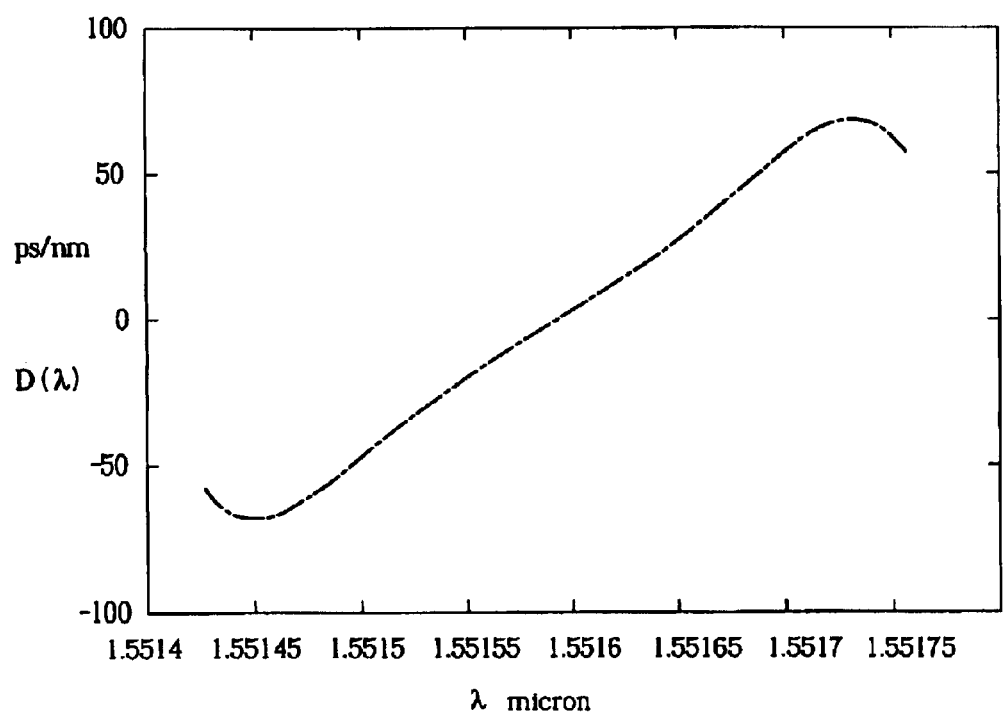
FIG. 20 is a graph of the dispersion of the GTIFR based 50 GHz interleaver in accordance with the present invention.

FIGS. 19 and 20 are graphs showing the group delay in picoseconds, and dispersion in picoseconds per nanometer, respectively, for an interleaver (or deinterleaver) as in FIG. 15, where the channel spacing is 50 GHz, the reflectivity $R_1$=18.5% and L=1.5 mm.

From FIG. 20, the dispersion is ±40 ps/nm in bandwidth of ±0.08 nm (±10 GHz).

Figure 21:
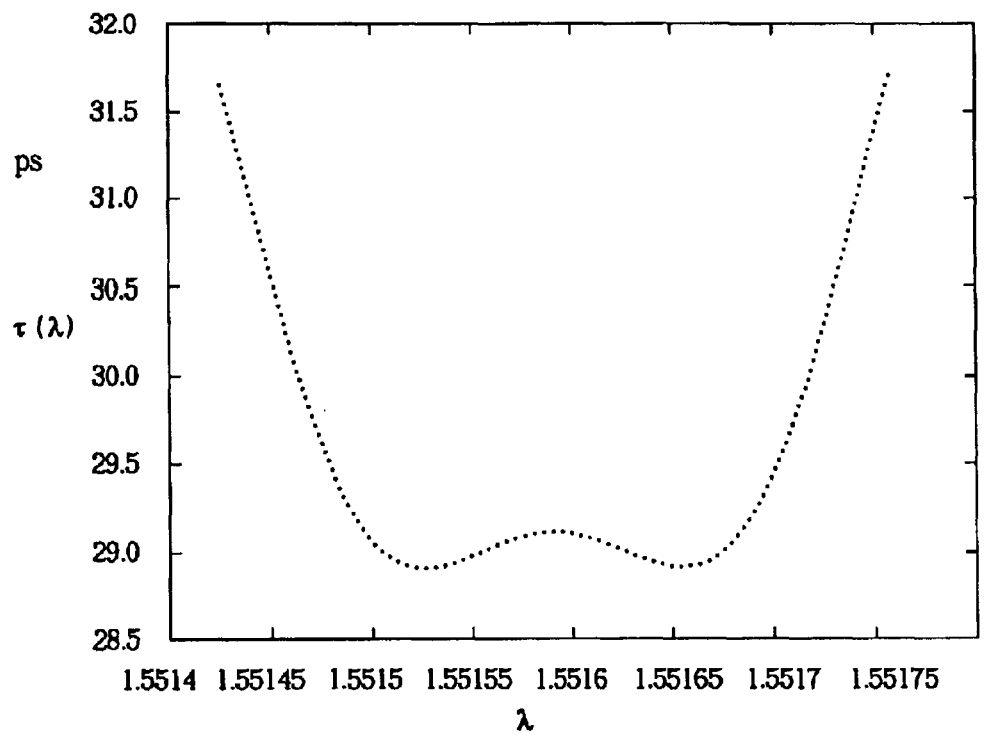
FIG. 21 is a graph of the group delay of the GTIFR based 50 GHz interleaver with a GTI dispersion compensator in accordance with the present invention.
Figure 22:
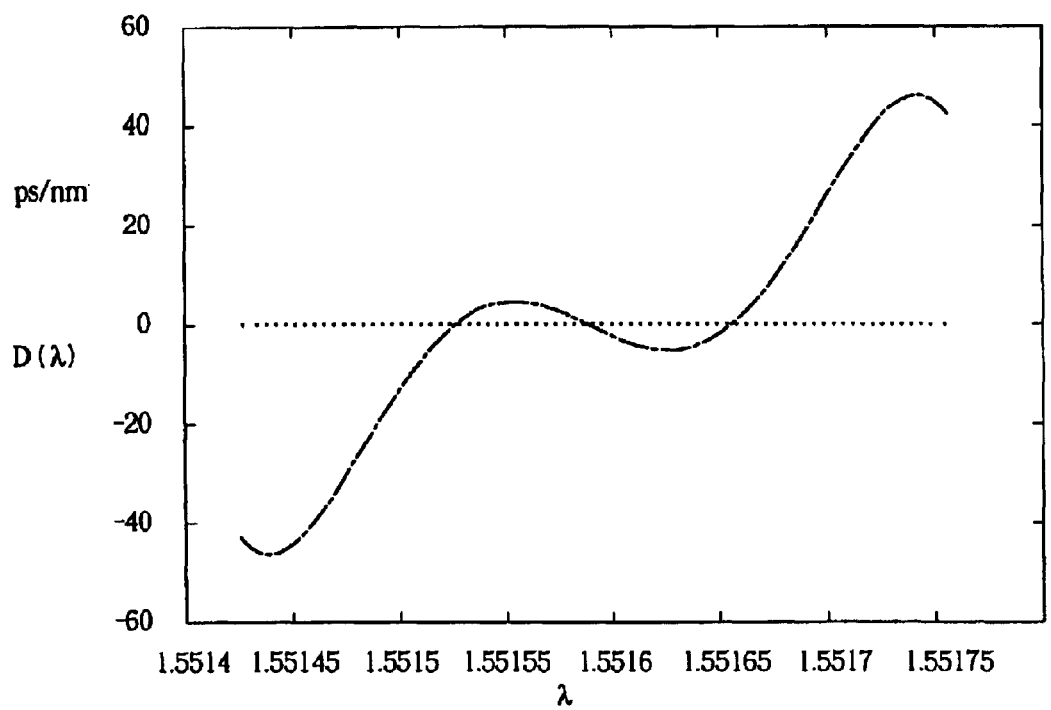
FIG. 22 is a graph showing the dispersion of the GTIFR based 50 GHz interleaver with a GTI dispersion compensator.

FIGS. 21 and 22 are graphs showing the group delay and dispersion, respectively, for a de-interleaver as in FIG. 16 and for an interleaver as in FIG. 17, wherein the channel spacing is 50 GHz, the reflectivity $R_1$=18.5% and L=1.5 mm, and wherein the dispersion compensator is a GTI as in FIG. 9 with cavity length d=3 mm and reflectivity of the partially reflective mirror $R_2$=0.28%.

In the present invention, the value $R_1$ may be in the range from about 17.2% to about 19.0%, while the value of 18.5% is preferred. Likewise, in the present invention, the value of $R_2$ may be in the range from about 0.28% to about 0.40%, while the value of 0.28% is preferred. A garnet is the preferred type of 45-degree Faraday and also the preferred type of 22.5-degree Faraday rotator, however, any other suitable type of Faraday rotators may be used in the present invention.

From FIG. 22, the dispersion is ±4.7 ps/nm in ±0.08 nm or ±10 GHz bandwidth. This is only 12% of the dispersion of the interleaver without dispersion compensation.

Exemplary embodiments of the present invention have been described herein. These are intended to be illustrative and not restrictive. Thus, the present invention is capable of many variations in detailed implementation, which may be derived from the description contained herein by a person of ordinary skill in the art. All such variations are considered to be within the scope of the appended claims.

What is claimed is:

1. An optical interleaver comprising:
   a) a polarization beam splitter for receiving one or more first even channel input signals and one or more first odd channel input signals and providing a first combined signal including said first even and odd channel signals, wherein said first even and odd channel signals in said first combined signal are orthogonally polarized; and
   b) a GTIFR interferometer for receiving said first combined signal and providing a first reflected signal, said GTIFR interferometer including:
      i) a Gires-Tournois interferometer comprising a partially reflective mirror, a highly reflective mirror spaced apart from and parallel to said partially reflective mirror with a cavity therebetween, wherein said first combined signal enters said cavity via said partially reflective mirror, and wherein said first reflected signal leaves said cavity via said partially reflective mirror;
      ii) a 45 degree Faraday rotator located in said cavity; and
      iii) a 22.5 degree Faraday rotator located outside said cavity in the path of said first combined and reflected signals;
   wherein said first reflected signal includes even and odd reflected channel signals having the same state of polarization.

2. The interleaver of claim 1, further comprising:
   a Gires Tournois interferometer dispersion compensator, wherein said first reflected signal is reflected from said Gires-Tournois interferometer dispersion compensator to produce a dispersion compensated output signal containing even channel signals and odd channel signals.

3. The interleaver of claim 2, wherein the Gires-Tournois interferometer dispersion compensator comprises a partially reflective mirror having reflectivity between about 0.28% and about 0.40%.

4. The interleaver of claim 2, wherein the Gires-Tournois interferometer dispersion compensator comprises a partially reflective mirror having reflectivity of about 0.28%.

5. The interleaver of claim 1, further comprising:
   a means for removing polarization from said first reflected signal.

6. The interleaver of claim 5, wherein said means for removing polarization from said first reflected signal comprises a half-wave plate for altering the direction of polarization of a portion of said first reflected signal by ninety degrees and a walk-off crystal for combining the remainder of said first reflected signal with said altered portion to produce an unpolarized output signal that contains even channel signals and odd channel signals.

7. The interleaver of claim 1, further comprising:
   a means for splitting arbitrarily-polarized even channel input signals into said first even channel input signals and one or more second even channel input signals, said first and second even channel input signals having first and second even predetermined states of polarization respectively;
   a means for splitting arbitrarily-polarized odd channel input signals into said first odd channel input signals and one or more second odd channel input signals, said first and second odd channel input signals having first and second odd predetermined states of polarization respectively, wherein said second even and odd channel input signals are combined by said polarization beam splitter to provide a second combined signal, and wherein said second combined signal is reflected from said GTIFR interferometer; and
   a means for combining said first and second reflected signals.

8. The interleaver of claim 1, wherein the reflectivity of said partially reflective mirror is between about 17.2% and about 19%.

9. An optical deinterleaver comprising:
   a) a GTIFR interferometer for receiving a first input signal including one or more first even input channel signals and one or more first odd input channel signals, all of said first input channel signals having the same state of polarization, and providing a first reflected signal including orthogonally polarized first even and odd reflected channel signals, said GTIFR interferometer including:
  i) a Gires-Tournois interferometer comprising a partially reflective mirror, a highly reflective mirror spaced apart from and parallel to said partially reflective mirror with a cavity therebetween, wherein said first input signal enters said cavity via said partially reflective mirror, and wherein said first reflected signal leaves said cavity via said partially reflective mirror;
  ii) a 45 degree Faraday rotator located in said cavity; and
  iii) a 22.5 degree Faraday rotator located outside said cavity in the path of said input and reflected signals; and
b) a polarization beam splitter for receiving said first reflected signal and providing a first even output signal including said even channel signals and a separate first odd output signal including said odd channel signals.

10. The deinterleaver of claim 9, further comprising:
a Gires-Tournois interferometer dispersion compensator from which said first input signal is reflected before being reflected by said GTIFR interferometer.

11. The deinterleaver of claim 10, wherein the Gires-Tournois dispersion compensator comprises a partially reflective mirror having reflectivity of between about 0.28% and about 0.40%.

12. The deinterleaver of claim 10, wherein said Gires-Tournois dispersion compensator comprises a partially reflective mirror having reflectivity of about 0.28%.

13. The deinterleaver of claim 9, further comprising
a means for removing polarization from said first even output signal.

14. The deinterleaver of claim 13, wherein said means for removing polarization from said first even output signal comprises a half-wave plate for altering the direction of polarization of a portion of said first even output signal by ninety degrees and a walk-off crystal for combining the remainder of said first even output signal with said altered portion to produce an unpolarized even output signal.

15. The deinterleaver of claim 9, further comprising:
a means for removing polarization from said first odd output signal.

16. The deinterleaver of claim 15, wherein said means for removing polarization from said first odd output signal comprises a half-wave plate for altering the direction of polarization of a portion of said first odd output signal by ninety degrees and a walk-off crystal for combining the remainder of said first odd output signal with said altered portion to produce an unpolarized odd output signal.

17. The deinterleaver of claim 9, further comprising:
a means for splitting an arbitrarily-polarized input signal into said first input signal and a second input signal, said first and second input signals having first and second predetermined states of polarization respectively, wherein said second input signal is reflected from said GTIFR interferometer to provide a second reflected signal including orthogonally polarized second even and odd reflected channel signals;
a means for combining said first and second even reflected channel signals; and
a means for combining said first and second odd reflected channel signals.

18. The deinterleaver of claim 9, wherein the reflectivity of said partially reflective mirror is between about 17.2% and about 19%.

* * * * *